United States Patent
Hopkins et al.

(10) Patent No.: US 10,633,400 B2
(45) Date of Patent: Apr. 28, 2020

(54) NANOCOMPOSITE SILICON OXYGEN CARBON MATERIALS AND USES

(71) Applicant: MELIOR INNOVATIONS, INC., Houston, TX (US)

(72) Inventors: Andrew R. Hopkins, Sylvania, OH (US); Douglas M. Dukes, Troy, NY (US); Brian L. Benac, Hadley, NY (US); Ashish P. Diwanji, New Albany, OH (US); Charles C. Rinzler, Cambridge, MA (US); Mark S. Land, Houston, TX (US)

(73) Assignee: Melior Innovations, Inc., Houston, TX (US)

( * ) Notice: Subject to any disclaimer, the term of this patent is extended or adjusted under 35 U.S.C. 154(b) by 0 days.

(21) Appl. No.: 15/593,165

(22) Filed: May 11, 2017

(65) Prior Publication Data
US 2018/0065995 A1    Mar. 8, 2018

Related U.S. Application Data

(63) Continuation-in-part of application No. 14/634,814, filed on Feb. 28, 2015, and a continuation-in-part of application No. 14/634,819, filed on Feb. 28, 2015.
(Continued)

(51) Int. Cl.
*C04B 35/571* (2006.01)
*C07F 7/08* (2006.01)
(Continued)

(52) U.S. Cl.
CPC ............ *C07F 7/0803* (2013.01); *B82Y 30/00* (2013.01); *C04B 35/56* (2013.01); *C04B 35/5603* (2013.01); *C04B 35/571* (2013.01); *C04B 35/806* (2013.01); *C07F 7/0838* (2013.01); *C07F 7/1804* (2013.01); *C08G 77/12* (2013.01); *C08K 3/14* (2013.01); *C08K 5/56* (2013.01); *C08L 83/00* (2013.01); *C08L 83/04* (2013.01); *C08L 83/06* (2013.01); *C09K 8/80* (2013.01);
(Continued)

(58) Field of Classification Search
CPC ......... C08G 77/20; C08G 77/50; C08L 83/04; C04B 35/515; C04B 35/64; C04B 35/56; C04B 35/5603; C04B 35/571; C04B 35/806; C09K 8/80
See application file for complete search history.

(56) References Cited

U.S. PATENT DOCUMENTS

7,799,426 B2 * 9/2010 Ippoliti ................. B82Y 30/00
                                                  428/403
9,815,943 B2 * 11/2017 Sherwood .............. C08G 77/20
(Continued)

OTHER PUBLICATIONS

Schoonman et al. Nanocomposites: Ionic Conducting Materials and Structural Spectroscopies. Springer US, 2008. p. 205.*

*Primary Examiner* — Noah S Wiese
(74) *Attorney, Agent, or Firm* — Glen P. Belvis; Belvis Law, LLC.

(57) ABSTRACT

Nanocomposite silicon and carbon compositions. These compositions can be made from polymer derived ceramics, and in particular, polysilocarb precursors. The nanocomposite can have non-voids or be nano-void free and can form larger macro-structures and macro-composite structures. The nanocomposite can contain free carbon domains in an amorphous SiOC matrix.

28 Claims, 20 Drawing Sheets

Related U.S. Application Data

(60) Provisional application No. 62/335,556, filed on May 12, 2016.

(51) Int. Cl.

| | |
|---|---|
| *C07F 7/18* | (2006.01) |
| *B82Y 30/00* | (2011.01) |
| *C08L 83/06* | (2006.01) |
| *C04B 35/80* | (2006.01) |
| *C08K 3/14* | (2006.01) |
| *C08L 83/04* | (2006.01) |
| *C08G 77/12* | (2006.01) |
| *C04B 35/56* | (2006.01) |
| *C09K 8/80* | (2006.01) |
| *C08K 5/56* | (2006.01) |
| *C08L 83/00* | (2006.01) |
| *C08G 77/00* | (2006.01) |
| *C08G 77/20* | (2006.01) |
| *C08L 83/14* | (2006.01) |

(52) U.S. Cl.
CPC .. *C01P 2002/60* (2013.01); *C04B 2235/3418* (2013.01); *C04B 2235/3826* (2013.01); *C04B 2235/44* (2013.01); *C04B 2235/48* (2013.01); *C04B 2235/483* (2013.01); *C04B 2235/528* (2013.01); *C04B 2235/5427* (2013.01); *C04B 2235/5436* (2013.01); *C04B 2235/6581* (2013.01); *C04B 2235/77* (2013.01); *C04B 2235/96* (2013.01); *C08G 77/20* (2013.01); *C08G 77/80* (2013.01); *C08L 83/14* (2013.01); *Y10T 428/131* (2015.01)

(56) References Cited

U.S. PATENT DOCUMENTS

| | | | |
|---|---|---|---|
| 2014/0274658 A1* | 9/2014 | Sherwood | C08G 77/20 501/154 |
| 2015/0252170 A1* | 9/2015 | Diwanji | C08L 83/04 424/61 |

* cited by examiner

|  | | Sample 8 | |
|---|---|---|---|
| $\delta^{29}Si$ (ppm) Range | Assignment | $\delta^{29}Si$ (ppm) | Area |
| +20 to -5 | $SiC_3O$ | | 0.00% |
| -5 to -15 | $SiC_4$ | -11.2 | 34.50% |
| -15 to -45 | $SiC_2O_2$ | -35.7 | 14.78% |
| -50 to -60 | $SiC(OH)O_2$ | | 0.00% |
| -65 to -75 | $SiCO_3$ | -71.4 | 19.89% |
| -100 to -115 | $SiO_4$ | -106.2 | 30.84% |

|  | | Sample 8 | |
|---|---|---|---|
| $\delta^{13}C$ (ppm) Range | Assignment | $\delta^{13}C$ (ppm) | Area |
| +160 to +130 | Graphitic Carbon | 171.05 | 3.28% |
| +160 to +130 | Graphitic Carbon | | 0.00% |
| +160 to +130 | Graphitic Carbon | 141.40 | 39.17% |
| +160 to +130 | Graphitic Carbon | | 0.00% |
| +125 to +95 | Turbostratic Carbon | 122.67 | 11.36% |
| +125 to +95 | Turbostratic Carbon | | 0.00% |
| +125 to +95 | Turbostratic Carbon | 104.47 | 6.95% |
| +80 to +40 | | 43.28 | 3.25% |
| +35 to +15 | | 26.97 | 32.10% |
| +14 to +10 | $-OSi\underline{C}_3$ | | 0.00% |
| -1 to -15 | $\equiv Si(\underline{C}H_3)$ | -3.15 | 3.90% |

FIG. 8

|  | | Sample 9 | |
|---|---|---|---|
| $\delta^{29}Si$ (ppm) Range | Assignment | $\delta^{29}Si$ (ppm) | Area |
| +20 to -5 | $SiC_3O$ | | 0.00% |
| -5 to -15 | $SiC_4$ | -10.5 | 39.78% |
| -15 to -45 | $SiC_2O_2$ | -36.0 | 16.97% |
| -50 to -60 | $SiC(OH)O_2$ | | 0.00% |
| -65 to -75 | $SiCO_3$ | -71.4 | 17.55% |
| -100 to -115 | $SiO_4$ | -106.4 | 25.70% |

|  | | Sample 9 | |
|---|---|---|---|
| $\delta^{13}C$ (ppm) Range | Assignment | $\delta^{13}C$ (ppm) | Area |
| +160 to +130 | Graphitic Carbon | | 0.00% |
| +160 to +130 | Graphitic Carbon | | 0.00% |
| +160 to +130 | Graphitic Carbon | 139.55 | 46.53% |
| +160 to +130 | Graphitic Carbon | | 0.00% |
| +125 to +95 | Turbostratic Carbon | 122.98 | 6.08% |
| +125 to +95 | Turbostratic Carbon | 109.75 | 4.27% |
| +125 to +95 | Turbostratic Carbon | | 0.00% |
| +80 to +40 | | 39.96 | 9.75% |
| +35 to +15 | | 27.01 | 29.83% |
| +14 to +10 | $-OSi\underline{C}_3$ | 15.88 | 3.54% |
| -1 to -15 | $\equiv Si(\underline{C}H_3)$ | | 0.00% |

FIG. 9

| $\delta^{29}Si$ (ppm) Range | Assignment | Sample 10 $\delta^{29}Si$ (ppm) | Area |
|---|---|---|---|
| +20 to -5 | $SiC_3O$ | | 0.00% |
| -5 to -15 | $SiC_4$ | -9.6 | 34.40% |
| -15 to -45 | $SiC_2O_2$ | -35.7 | 18.04% |
| -50 to -60 | $SiC(OH)O_2$ | | 0.00% |
| -65 to -75 | $SiCO_3$ | -71.1 | 18.07% |
| -100 to -115 | $SiO_4$ | -106.0 | 31.48% |

| $\delta^{13}C$ (ppm) Range | Assignment | Sample 10 $\delta^{13}C$ (ppm) | Area |
|---|---|---|---|
| +160 to +130 | Graphitic Carbon | | 0.00% |
| +160 to +130 | Graphitic Carbon | | 0.00% |
| +160 to +130 | Graphitic Carbon | 132.00 | 57.99% |
| +160 to +130 | Graphitic Carbon | | 0.00% |
| +125 to +95 | Turbostratic Carbon | | 0.00% |
| +125 to +95 | Turbostratic Carbon | 112.00 | 0.00% |
| +125 to +95 | Turbostratic Carbon | 100.00 | 0.00% |
| +80 to +40 | | | 0.00% |
| +35 to +15 | | 31.00 | 42.00% |
| +14 to +10 | -OSi$\underline{C}_3$ | | 0.00% |
| -1 to -15 | ≡Si($\underline{C}H_3$) | | 0.00% |

FIG. 10

|  | | Sample 11 | |
|---|---|---|---|
| $\delta^{29}$Si (ppm) Range | Assignment | $\delta^{29}$Si (ppm) | Area |
| +20 to -5 | SiC$_3$O | | 0.00% |
| -5 to -15 | SiC$_4$ | -10.3 | 34.64% |
| -15 to -45 | SiC$_2$O$_2$ | -36.1 | 16.96% |
| -50 to -60 | SiC(OH)O$_2$ | | 0.00% |
| -65 to -75 | SiCO$_3$ | -71.1 | 19.29% |
| -100 to -115 | SiO$_4$ | -105.8 | 29.12% |

|  | | Sample 11 | |
|---|---|---|---|
| $\delta^{13}$C (ppm) Range | Assignment | $\delta^{13}$C (ppm) | Area |
| +160 to +130 | Graphitic Carbon | | 0.00% |
| +160 to +130 | Graphitic Carbon | | 0.00% |
| +160 to +130 | Graphitic Carbon | 132.00 | 56.51% |
| +160 to +130 | Graphitic Carbon | | 0.00% |
| +125 to +95 | Turbostratic Carbon | 124.00 | 0.00% |
| +125 to +95 | Turbostratic Carbon | | 0.00% |
| +125 to +95 | Turbostratic Carbon | 100.00 | 0.00% |
| +80 to +40 | | | 0.00% |
| +35 to +15 | | 30.00 | 43.49% |
| +14 to +10 | -OSi$\underline{C}_3$ | | 0.00% |
| -1 to -15 | ≡Si($\underline{C}$H$_3$) | | 0.00% |

FIG. 11

| | | Sample 12 | |
|---|---|---|---|
| $\delta^{29}Si$ (ppm) Range | Assignment | $\delta^{29}Si$ (ppm) | Area |
| +20 to -5 | SiC$_3$O | | 0.00% |
| -5 to -15 | SiC$_4$ | -10.7 | 35.96% |
| -15 to -45 | SiC$_2$O$_2$ | -36.4 | 16.13% |
| -50 to -60 | SiC(OH)O$_2$ | | 0.00% |
| -65 to -75 | SiCO$_3$ | -71.2 | 18.95% |
| -100 to -115 | SiO$_4$ | -105.8 | 28.96% |

| | | Sample 12 | |
|---|---|---|---|
| $\delta^{13}C$ (ppm) Range | Assignment | $\delta^{13}C$ (ppm) | Area |
| +160 to +130 | Graphitic Carbon | | 0.00% |
| +160 to +130 | Graphitic Carbon | | 0.00% |
| +160 to +130 | Graphitic Carbon | 137.00 | 60.32% |
| +160 to +130 | Graphitic Carbon | | 0.00% |
| +125 to +95 | Turbostratic Carbon | 124.00 | 0.00% |
| +125 to +95 | Turbostratic Carbon | | 0.00% |
| +125 to +95 | Turbostratic Carbon | 103.00 | 0.00% |
| +80 to +40 | | | 0.00% |
| +35 to +15 | | 32.00 | 39.68% |
| +14 to +10 | -OSi<u>C</u>$_3$ | | 0.00% |
| -1 to -15 | ≡Si(<u>C</u>H$_3$) | | 0.00% |

FIG. 12

8515 pyrolized @ 1150°C

| ID | IG | Laser Wavelength (nm) | Size (nm) |
|---|---|---|---|
| 1616207 | 820789 | 514 | 2.5 |
| 691269 | 314447 | 514 | 2.3 |
| 621987 | 380722 | 514 | 3 |
| 405464 | 249128 | 514 | 3 |
| 267111 | 184423 | 514 | 3.4 |

FIG. 15A 5050 pyrolized @ 1300°C

| ID | IG | Laser Wavelength (nm) | Size (nm) |
|---|---|---|---|
| 2896932.9 | 2359186.5 | 514 | 4 |
| 2557027.9 | 2203892.7 | 514 | 4.3 |
| 4569082.9 | 4034572.6 | 514 | 4.4 |
| 3887277.8 | 3874446 | 514 | 4.9 |
| 602637.9 | 441766.8 | 514 | 3.6 |
| 649295.6 | 455807 | 514 | 3.5 |

FIG. 15B 5050 pyrolized @ 1150°C

| ID | IG | Laser Wavelength (nm) | Size (nm) |
|---|---|---|---|
| 1027590 | 658389 | 514 | 3.2 |
| 1151857 | 808860 | 514 | 3.5 |
| 740607 | 468358 | 514 | 3.1 |
| 410654 | 280665 | 514 | 3.4 |
| 621987 | 380722 | 514 | 3.0 |
| 207800 | 109323 | 514 | 2.6 |
| 701751 | 415966 | 514 | 2.9 |

FIG. 15C 5050 pyrolized @ 850°C

| ID | IG | Laser Wavelength (nm) | Size (nm) |
|---|---|---|---|
| 7243438 | 3405955.9 | 514 | 2.33 |
| 603272 | 398305 | 514 | 3.3 |
| 728034 | 386922 | 514 | 2.6 |
| 693442 | 348467 | 514 | 2.5 |
| 819174 | 394855 | 514 | 2.4 |
| 2045170 | 1175083 | 514 | 2.8 |

FIG. 15D 6040 pyrolized @ 1150°C

| ID | IG | Laser Wavelength (nm) | Size (nm) |
|---|---|---|---|
| 720082 | 409156 | 514 | 2.8 |
| 458739 | 280095 | 514 | 3.0 |
| 344579 | 212778 | 514 | 3.1 |
| 2206863 | 1637621 | 514 | 3.7 |

FIG. 15E

SiOBC pyrolized @ 1300°C

| ID | IG | Laser Wavelength (nm) | Size (nm) |
|---|---|---|---|
| 2087749.6 | 1611561.3 | 514 | 3.8 |
| 1236771 | 1256722.6 | 514 | 5.0 |
| 256357.5 | 267394 | 514 | 5.2 |
| 480155 | 332344.9 | 514 | 3.4 |
| 374379.7 | 304531 | 514 | 4.0 |
| 568609 | 435785 | 514 | 3.8 |
| 1279415.8 | 1087723 | 514 | 4.2 |

FIG. 15F

SiOBC pyrolized @ 1150°C

| ID | IG | Laser Wavelength (nm) | Size (nm) |
|---|---|---|---|
| 10312727 | 7528007 | 514 | 3.6 |
| 4957699 | 4179974 | 514 | 4.2 |
| 9843482 | 5930551 | 514 | 3.0 |
| 17028880 | 8523933 | 514 | 2.5 |
| 18275102 | 7706248 | 514 | 2.1 |
| 10653821 | 9848610 | 514 | 4.6 |

FIG. 15G

SiOBC pyrolized @ 950°C

| ID | IG | Laser Wavelength (nm) | Size (nm) |
|---|---|---|---|
| 387015 | 215698 | 514 | 2.8 |
| 596337 | 311897 | 514 | 2.6 |
| 607471 | 283883 | 514 | 2.3 |
| 1572167 | 964681 | 514 | 3.0 |
| 509967 | 282400 | 514 | 2.7 |

NANOCOMPOSITE SILICON OXYGEN CARBON MATERIALS AND USES

This application: (i) claims under 35 U.S.C. § 119(e)(1) the benefit of U.S. provisional application Ser. No. 62/335,556 filed May 12, 2016; (ii) is a continuation-in-part of U.S. patent application Ser. No. 14/634,814 filed Feb. 28, 2015; and, (iii) a continuation-in-part of U.S. patent application Ser. No. 14/634,819 filed Feb. 28, 2015, the entire disclosure of each of which are incorporated herein by reference.

BACKGROUND OF THE INVENTION

Field Of The Invention

The present inventions relate to polyorganic compositions, structures and materials; polymer derived preceramic and ceramic materials; and in particular, polysilocarb compositions, structures and materials. The present inventions further relate to systems methods and applications for making and using these materials and products based upon these materials.

In particular, the present inventions relate to polyorganic composite materials; polymer derived ceramic materials; and in particular nanocomposite compositions, structures and materials. The present inventions further relate to applications and uses for these compositions, structures and material As used herein, unless specified otherwise, the term "bulk density", should be given its broadest possible meaning, and generally means the weight of a group of particles per volume filled by those particles. It can be determined by a dry test to gain an estimation of the weight of a group of particles that will fill a unit volume, and includes both void volume within the particles (e.g., internal porosity) and spaces between the particles. For example, this parameter can be used to determine the total weight of the particles needed to fill a storage tank, a catalytic converter chamber, or a filter pack.

As used herein, unless specified otherwise, the terms specific gravity, which is also called apparent density, should given their broadest possible meanings, and generally mean weight per until volume of a structure, e.g., volumetric shape of material. This property would include internal porosity of a particle as part of its volume. It can be measured with a low viscosity fluid that wets the particle surface.

As used herein, unless specified otherwise, the terms actual density, which may also be called true density, should be given their broadest possible meanings, and general mean weight per unit volume of a material, when there are no voids present in that material. This measurement and property essentially eliminates any internal porosity from the material, e.g., it does not include any voids in the material.

Thus, a collection of porous foam balls (e.g., Nerf® balls) can be used to illustrate the relationship between these three properties. The weight of the balls filling a container would be the bulk density for the balls:

$$\text{Bulk Density} = \frac{\text{weight of balls}}{\text{volume of container filled}}$$

The weight of a single ball per the ball's spherical volume would be its apparent density:

$$\text{Apparent Density} = \frac{\text{weight of one ball}}{\text{volume of that ball}}$$

The weight of the material making up the skeleton of the ball, i.e., the ball with all void volume removed, per the remaining volume of that material would be the actual density:

$$\text{Actual Density} = \frac{\text{weight of material}}{\text{volume of void free material}}$$

Generally, the term "about" as used herein, unless specified otherwise, is meant to encompass a variance or range of ±10%, the experimental or instrument error associated with obtaining the stated value, and preferably the larger of these.

As used herein, unless specified otherwise the terms %, weight % and mass % are used interchangeably and refer to the weight of a first component as a percentage of the weight of the total, e.g., formulation, mixture, preform, material, structure or product. The usage X/Y or XY indicates weight % of X and the weight % of Y in the formulation, unless expressly provided otherwise. The usage X/Y/Z or XYZ indicates the weight % of X, weight % of Y and weight % of Z in the formulation, unless expressly provided otherwise. (As used herein unless specifically stated otherwise, "50/50", "5050" and "50:50" refer to formulations having 50% MHF and 50% DCPD.)

As used herein, unless specified otherwise "volume %" and "% volume" and similar such terms refer to the volume of a first component as a percentage of the volume of the total, e.g., formulation, mixture, preform, material, structure or product.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

There has been a long-standing and unfulfilled need for new materials that have performance characteristic and features of high price materials but with lower costs and greater flexibility in manufacturing and using the material. There has also been a long-standing and unfulfilled need for new materials that have enhanced performance characteristics and features over existing ceramics, plastics and other materials. The present inventions, among other things, solve these needs by providing the articles of manufacture, devices and processes taught, disclosed and claimed herein.

Thus, there is provided a nanocomposite material having: a first composition having silicon, free carbon and a first moiety and a second composition having silicon and a second moiety; and wherein the first and second compositions are different compositions.

There is further provided these compositions having one or more of the following features: wherein the first moiety and the second moiety are the same; wherein the first moiety and the second moiety are different; having a third composition; and wherein the third composition is different from the first and second compositions; having a third composition; and wherein the third composition is different from the first and second compositions; having a third composition;

and wherein the third composition is different from the first and second compositions; wherein the first composition is a polymer derived ceramic composition and is a bulk phase; wherein the first composition is a polymer derived ceramic composition and is a bulk phase; wherein the first composition is a polymer derived ceramic composition and is a bulk phase; wherein the second composition is a polymer derived ceramic composition and is a bulk phase; wherein the second composition is a polymer derived ceramic composition and is a bulk phase; wherein the second composition is a polymer derived ceramic composition and is a bulk phase; wherein the first composition is selected from the group consisting of $Si(CH_3)_3O$, $SiC_4$, $Si(CH_3)_2O_2$, $SiC_2O_2$, $Si(CH_3)(OH)O_2$, $SiCO_3$, and $SiO_4$; wherein the first composition is selected from the group consisting of $Si(CH_3)_3O$, $SiC_3O$, $SiC_4$, $Si(CH_3)_2O_2$, $SiC_2O_2$, $SiCO_3$, and $SiO_4$; wherein the first composition is selected from the group consisting of $Si(CH_3)_3O$, $SiC_3O$, $SiC_4$, $Si(CH_3)_2O_2$, $Si(CH_3)(OH)O_2$, $SiCO_3$, and $SiO_4$; wherein the first composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$; wherein the first composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$; wherein the first composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$; wherein the first composition has a moiety selected from the group consisting of esters, ketones, sp² carbon structures, —C—O—C—, —C—O—Si—, alkanes, terminal end $Si(CH_3)_2O$, —Si—C—C—Si—, —$Si(CH_3)_2O_2$, and $Si(CH_3)O_2$; wherein the first composition has a moiety selected from the group consisting of esters, ketones, conjugated aliphatic carbon structures, aromatic sp² carbon structures, —C—O—C—, —C—O—Si—, alkanes, terminal end $Si(CH_3)_2O$, —Si—C—C—Si— and $Si(CH_3)O_2$; wherein the first composition has a moiety selected from the group consisting of esters, ketones, conjugated aliphatic carbon structures, sp² carbon structures, —C—O—C—, —C—O—Si—, alkanes, terminal end $Si(CH_3)_2O$, —Si—C—C—Si—, —$Si(CH_3)_2O_2$, and $Si(CH_3)O_2$; wherein the first composition has a moiety selected from the group consisting of esters, ketones, sp² carbon structures 6 to 20 carbons, —C—O—C—, —C—O—Si—, alkanes, terminal end $Si(CH_3)_2O$, —Si—C—C—Si—, —$Si(CH_3)_2O_2$, and $Si(CH_3)O_2$; wherein the first composition has a moiety selected from the group consisting of esters, ketones, sp² carbon structures, —C—O—C—, —C—O—Si—, alkanes, terminal end $Si(CH_3)_2O$, —Si$(CH_3)_2O_2$, and $Si(CH_3)O_2$; wherein the first composition has a moiety selected from the group consisting of esters, ketones, sp² carbon structures, —C—O—C—, —C—O—Si—, alkanes, terminal end $Si(CH_3)_2O$, —Si—C—C—Si—, —$Si(CH_3)_2O_2$, and $Si(CH_3)O_2$; wherein the first composition has a moiety selected from the group consisting of esters, ketones, aromatic sp² carbon structures, sp² carbon structures, —C—O—C—, —C—O—Si—, alkanes, terminal end $Si(CH_3)_2O$, —Si—C—C—Si—, $Si(CH_3)O_3$, —$Si(CH_3)_2O_2$, and $Si(CH_3)O_2$; wherein the second composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$; wherein the second composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$; and, wherein the second composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$. wherein the first composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$.

Moreover, there are provided these nanocomposites having one or more of the following features: wherein the first composition comprises a moiety selected from the group consisting of esters, ketones, aromatic sp² carbon structures having 6 or more carbons, —C—O—C—, —C—O—Si—, alkanes, terminal end $Si(CH_3)_2O$, —Si—C—C—Si—, —$Si(CH_3)_2O_2$, and $Si(CH_3)O_2$; wherein the second composition has a moiety selected from the group consisting of esters, ketones, sp² carbon structures, —C—O—C—, —C—O—Si—, alkanes, terminal end $Si(CH_3)_2O$, —Si—C—C—Si—, —$Si(CH_3)_2O_2$, and $Si(CH_3)O_2$; wherein the second composition has a moiety selected from the group consisting of esters, ketones, aromatic sp² carbon structures having 6 or more carbons, —C—O—C—, —C—O—Si—, alkanes, terminal end $Si(CH_3)_2O$, —Si—C—C—Si—, —$Si(CH_3)_2O_2$, and $Si(CH_3)O_2$; wherein the second composition has a moiety selected from the group consisting of esters, ketones, sp² carbon, —C—O—C—, —C—O—Si—, alkanes, terminal end $Si(CH_3)_2O$, —Si—C—C—Si—, —$Si(CH_3)_2O_2$, and $Si(CH_3)O_2$; wherein the second composition has a moiety selected from the group consisting of esters, ketones, sp² carbon structures, —C—O—C—, —C—O—Si—, alkanes, terminal end $Si(CH_3)_2O$, —Si—C—C—Si—, —$Si(CH_3)_2O_2$, and $Si(CH_3)O_2$; and, wherein the first composition has a moiety selected from the group consisting of esters, ketones, sp² carbon structures, —C—O—C—, —C—O—Si—, alkanes, terminal end $Si(CH_3)_2O$, —Si—C—C—Si—, —$Si(CH_3)_2O_2$, and $Si(CH_3)O_2$.

Yet additionally there are provided these nanocomposite materials having a specific gravity of from about 1.8 g/cc to about 2.2 g/cc and being substantial free of nano-voids larger than 0.01 µm; having a specific gravity of from about 1.8 g/cc to about 2.2 g/cc and being substantial free of nano-voids larger than 0.1 µm; having a specific gravity of from about 1.8 g/cc to about 2.5 g/cc and being substantial free of nano-voids larger than 0.001 µm; having a specific gravity of from about 1.8 g/cc to about 2.2 g/cc and being substantial free of nano-voids larger than 0.01 µm; having a specific gravity of from about 1.8 g/cc to about 2.5 g/cc and being substantial free of nano-voids larger than 0.01 µm; and, having a specific gravity of from about 1.8 g/cc to about 2.2 g/cc and being substantial free of nano-voids larger than 0.001 µm.

Still further there is provided a nanocomposite material having: a first composition having a free carbon domain and a second composition having a plurality of silicon based moieties; and wherein the first and second compositions are different compositions.

There is additionally provided these nanocomposite materials having one or more of the following features: wherein the free carbon domain is selected from the group consisting of sp² carbon, aromatic structures having 6 or more carbons, bent ring aromatic structures, conjugated aliphatic carbons, conjugated aliphatic carbons having from 3 to 10 carbons, conjugated aliphatic carbons having from 10 to 20 carbons, and alkanes; wherein the free carbon domain is selected from the group consisting of turbostratic, amorphous, graphenic, and graphitic; wherein at least one of the moieties is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3SiO_4$, esters, ketones, C—O—C, C—O—Si, $Si(CH_3)_2O$, Si—C—C—Si, $Si(CH_3)_2O_2$, and $Si(CH_3)O_2$; wherein at least one of the moieties is selected from the group consisting of $Si(CH_3)_3O$, $SiC_3O$, $SiC_4$, $Si(CH_3)_2O_2$, $SiC_2O_2$, $Si(CH_3)$ (OH)O$_2$, SiCO$_3$SiO$_4$, esters, ketones, C—O—C, C—O—Si, Si(CH$_3$)$_2$O, Si—C—C—Si, Si(CH$_3$)$_2$O$_2$, and Si(CH$_3$)O$_2$; wherein at least one of the moieties is selected from the group consisting of Si(CH$_3$)$_3$O, SiC$_3$O, SiC$_4$, Si(CH$_3$)$_2$O$_2$, SiC$_2$O$_2$, Si(CH$_3$) (OH)O$_2$, SiCO$_3$SiO$_4$, esters, ketones, C—O—C, C—O—Si, Si(CH$_3$)$_2$O, Si—C—C—Si, Si(CH$_3$)$_2$ O$_2$, and Si(CH$_3$)O$_2$; having a specific gravity of from about 1.5 g/cc to about 1.9 g/cc and having nano-voids larger than 0.001 μm; having a specific gravity of from about 1.1 g/cc to about 1.5 g/cc and having nano-voids larger than 0.01 μm; having a specific gravity of from about 1.6 g/cc to about 2.5 g/cc and being substantial free of nano-voids larger than 0.01 μm; having a specific gravity of from about 1.6 g/cc to about 2.5 g/cc and being substantial free of nano-voids larger than 0.001 μm; having a specific gravity of from about 1.6 g/cc to about 2.5 g/cc and being substantial free of nano-voids larger than 0.0001 μm.

Yet additionally, there is provided these nanocomposite materials that have one or more of the following features: wherein the free carbon domain has a cross section of from about 2 to about 3.4 μm; wherein the free carbon domain has a cross section of from about 2 to about 5.5 μm; wherein the free carbon domain has a cross section of from about 3.5 to about 4.9μ; and, wherein the free carbon domain has a cross section of from about 3.8 to about 5.2 μm.

BRIEF DESCRIPTION OF THE DRAWINGS

FIG. 8 are tables of area under peaks, corresponding relative amounts of moieties, and other NMR based data, for an embodiment of a nanocomposite, 46/34/20 MHF/TV/VT, in accordance with the present inventions determined by $^{29}$Si solid state mas NMR and determined by $^{13}$C solid state mas NMR.

FIG. 9 are tables of area under peaks, corresponding relative amounts of moieties, and other NMR based data, for an embodiment of a nanocomposite, 40/40/20 MHF/TV/VT, in accordance with the present inventions determined by $^{29}$Si solid state mas NMR and determined by $^{13}$C solid state mas NMR.

FIG. 10 are tables of area under peaks, corresponding relative amounts of moieties, and other NMR based data for an embodiment of a nanocomposite, 46/34/20 MHF/TV/VT, in accordance with the present inventions determined by $^{29}$Si solid state mas NMR and determined by $^{13}$C solid state mas NMR.

FIG. 11 are tables of area under peaks, corresponding relative amounts of moieties, and other NMR based data for an embodiment of a nanocomposite, 46/34/20 MHF/TV/VT, in accordance with the present inventions determined by $^{29}$Si solid state mas NMR and determined by $^{13}$C solid state mas NMR.

FIG. 12 are tables of area under peaks, corresponding relative amounts of moieties, and other NMR based data for an embodiment of a nanocomposite, 46/34/20 MHF/TV/VT, in accordance with the present inventions determined by $^{29}$Si solid state mas NMR and determined by $^{13}$C solid state mas NMR.

FIG. 15A is a table of Raman spectra data estimates of the size of the free carbon domains for an 85/15 MHF/DCPD pyrolized at 1150° C. nanocomposite, where ID and IG are peak intensity of D and G bands of Carbon, in accordance with the present inventions.

FIG. 15B is a table of Raman spectra data estimating the size of the free carbon domains for a 50/50 MHF/DCPD pyrolized at 1300° C. nanocomposite, where ID and IG are peak intensity of D and G bands of carbon, in accordance with the present inventions.

FIG. 15C is a table of Raman spectra data estimating the size of the free carbon domains for a 50/50 MHF/DCPD pyrolized at 1150° C. nanocomposite, where ID and IG are peak intensity of D and G bands of carbon, in accordance with the present inventions.

FIG. 15D is a table of Raman spectra data estimating the size of the free carbon domains for a 50/50 MHF/DCPD pyrolized at 850° C. nanocomposite, where ID and IG are peak intensity of D and G bands of carbon, in accordance with the present inventions.

FIG. 15E is a table of Raman spectra data estimating the size of the free carbon domains for a 60/40 MHF/DCPD pyrolized at 1150° C. nanocomposite, where ID and IG are peak intensity of D and G bands of carbon, in accordance with the present inventions.

FIG. 15F is a table of Raman spectra data estimating the size of the free carbon domains for a SiOBC pyrolized at 1300° C. nanocomposite, where ID and IG are peak intensity of D and G bands of carbon, in accordance with the present inventions.

FIG. 15G is a table of Raman spectra data estimating the size of the free carbon domains for a SiOBC pyrolized at 1150° C. nanocomposite, where ID and IG are peak intensity of D and G bands of carbon, in accordance with the present inventions.

FIG. 15H is a table of Raman spectra data estimating the size of the free carbon domains for a SiOB pyrolized at 950° C. nanocomposite, where ID and IG are peak intensity of D and G bands of carbon, in accordance with the present inventions.

DESCRIPTION OF THE PREFERRED EMBODIMENTS

Figure 1:
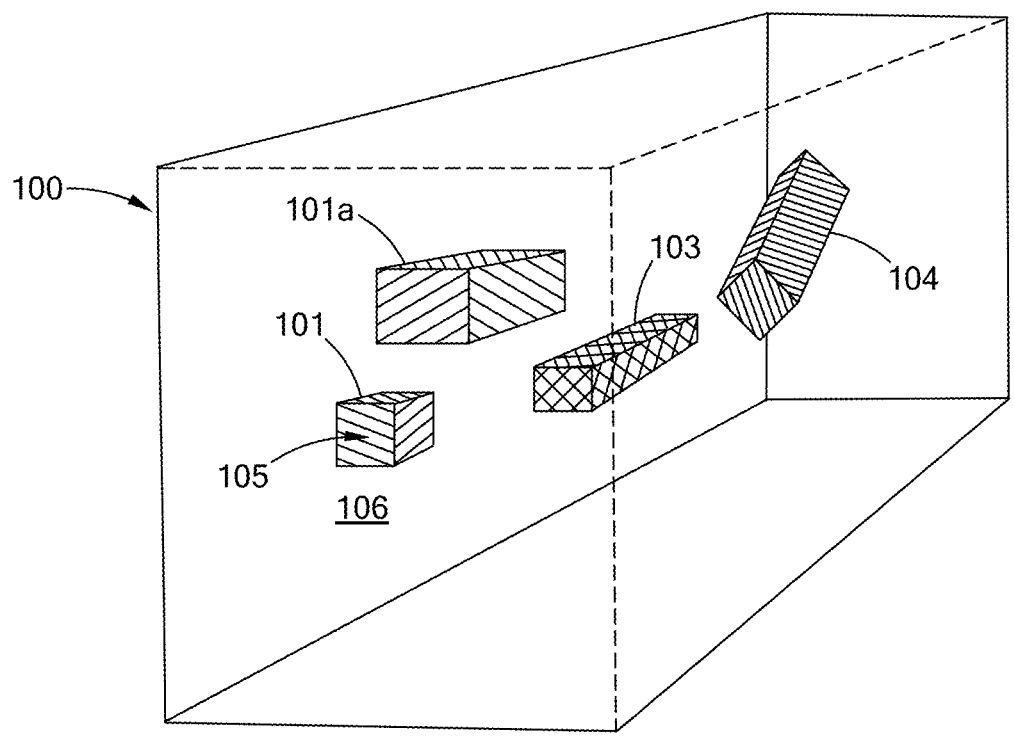
FIG. 1 is a perspective schematic view of an embodiment of a nanocomposite material in accordance with the present inventions.

In general, the present inventions relate to materials having a nanocomposite structure of silicon and carbon. This nanocomposite structure provides many, and varied, material properties and features, which in turn can provide substantial performance and functional benefits in various applications for, and uses of, these nanocomposite materials.

Embodiments of the present inventions, among other things, relate to materials, including materials that can generally be viewed as ceramics, having nanocomposite structures of various configurations, makeups and morphologies.

In general, the present inventions relate to unique and novel silicon (Si) based materials that are easy to manufacture, handle and have surprising and unexpected properties and applications. These silicon based materials have applications and utilizations as a liquid material, a cured material, e.g., a plastic, a preceramic, and a pyrolized material, e.g., a ceramic.

Thus, the present inventions provide a new material system and platform having many varied formulations, features, applications and uses, which in general could not be obtained with prior materials, and in particular with prior silicon based products. For example, generally, these features, applications and uses could not be obtained with prior silicon based products at acceptable costs, volumes, manufacturing conditions, handling requirements, or processing conditions, among other things.

The term "nanocomposite" as used herein and unless specifically stated otherwise, is intended to have its broadest possible meaning. The term is not intended to limit, or even relate to the size of a volumetric shape that the nanocomposite material may be formed into, e.g., a macro-structure. For example, the nanocomposite material may be used to form macro-structures, e.g., building components such as an I-beam, a large truck cluck, the wing of an airplane, a proppant for hydraulic fracturing, a pigment, spherical like beads having diameters from about 8,000 µm to about 0.1 µm, and particles having cross sections from about 8,000 µm to about 0.1 µm. Smaller and larger sizes and various shapes and configurations of macro-structures are contemplated. (See, e.g., the shapes, structures and applications disclosed and taught in US Patent Application Publ. Nos. 2015/0175750, 2014/0326453, 2016/0046529, 2016/0207782, and 2015/0252166, the entire disclosures of each of which are incorporated herein by reference.) Rather, the term, "nano-" as used in the term nanocomposite, relates to the micro-structure of these materials.

In general, the term "nanocomposite," as used herein, and unless specifically provided otherwise, conveys that in embodiments of this material there are one, two, three, four or more different components; and one or more of these components can be in one, two, three, four or more different states (e.g., association of an atom with other atoms, nature of atomic bonds (e.g., covalent, ionic, $sp^2$, $sp^3$, etc.), structure (e.g., crystalline, amorphous, planer, tubes, spheres, grains, cubes, etc.)).

In embodiments of the nanocomposites one or more of these components can have a cross section of less than about 1 µm, less than about 0.1 µm, less than about 0.01 µm, and less than about 0.001 µm; and from about 0.001 µm to about 1 µm, from about 0.002 µm to about 0.005 µm, from about 0.001 µm to about 0.01 µm, and from about 0.01 µm to about 0.1 µm. Larger and smaller sizes are contemplated.

In embodiments of the nanocomposites one or more of the components can have a cross section of greater than about 0.1 µm, greater than about 1 µm, greater than about 10 µm, and greater than about 100 µm; and from about 0.01 µm to about 150 µm, from about 0.001 µm to about 100 µm, from about 0.1 µm to about 0.10 µm, and from about 1 µm to about 20 µm. Larger and smaller sizes are contemplated.

In embodiments of the nanocomposites one or more of the components can constitute the bulk, or matrix phase, (e.g., a continuous, or substantially continuous phase) of the nanocomposite, and one or more of the components can constitute the dispersed or non-continuous phase. It being understood that in some embodiments the bulk phase and the non-continuous phase may be intertwined, or otherwise associated, to such an extent that they can be viewed as two or more continuous phases with no non-continuous phase; or two of more non-continuous phases with no continuous phase; and combinations and variations of these and other features. Thus, embodiments where multiple and different components, and components in multiple and different states, represent the bulk phase of the nanocomposite, the dispersed phase of the nanocomposite and combinations and variations of these and other features, are contemplated.

In embodiments of the present inventions the components can be carbon (C), nitrogen (N), silicon (Si), oxygen (O), boron (B), as well as, other elements and compounds. Such as, for example, Aluminum, Titanium, Zirconium, Hafnium, Vanadium, Niobium, Tantalum, Yttrium, Lanthanum, Cerium, Praseodymium, Neodymium, Samarium, Europium, Gadolinium, Terbium, Dysprosium, Holmium, Erbium, Thulium, Ytterbiun, Lutetium, rare earths, Phosphorous, Magnesium, Sodium, Calcium, Iron, Cobalt, Zinc, Copper, Beryllium, Nickel, Molybdenum, and metal matric composites (macroscopic and microscopic).

Embodiments may include polymer derived ceramic ("PDC") materials, products and applications that are using, based on, or constituting PDCs generally.

Polymer derived ceramics (PDC) are ceramic materials that are derived from, e.g., obtained by, the pyrolysis of polymeric materials. Polymer derived ceramics may be derived from many different kinds of precursor formulations, e.g., starting materials, starting formulations. PDCs may be made of, or derived from, carbosilane or polycarbosilane (Si—C), silane or polysilane (Si—Si), silazane or polysilazane (Si—N—Si), silicon carbide (SiC), carbosilazane or polycarbosilazane (Si—N—Si—C—Si), siloxane or polysiloxanes (Si—O), to name a few.

Embodiments of the present inventions preferably use, are based upon or constitute PDCs that are "polysilocarb" materials, e.g., materials containing silicon (Si), oxygen (O) and carbon (C), and embodiments of such materials that have been cured, and embodiments of such materials that have been pyrolized. Polysilocarb materials may also contain other elements. Polysilocarb materials are made from one or more polysilocarb precursor formulation or precursor formulation. The polysilocarb precursor formulation contains one or more functionalized silicon polymers, or monomers, non-silicon based cross linkers, as well as, potentially other ingredients, such as for example, inhibitors, catalysts, fillers, dopants, modifiers, initiators, reinforcers, fibers, particles, colorants, pigments, dies, the same or other PDCs, ceramics, metals, metal complexes, and combinations and variations of these and other materials and additives. Silicon oxycarbide materials, SiOC compositions, and similar such terms, unless specifically stated otherwise, refer to polysilocarb materials, and would include liquid materials, solid uncured materials, cured materials, ceramic materials, and combinations and variations of these.

Examples of PDCs, PDC formulations, potential precursors, starting materials, and apparatus and methods for making these materials, that can be used, or adapted and improved upon employing the teachings of this specification to be used, in embodiments of the present inventions are found, for example, in US Patent Publication Nos. 2014/0274658, 2014/0323364, 2015/0175750, 2016/0207782, 2016/0280607, 2017/0050337, 2008/0095942, 2008/0093185, 2007/0292690, 2006/0069176, 2006/0004169, and 2005/0276961, and U.S. Pat. Nos. 9,499,677, 9,481,781, 8,742,008, 8,119,057, 7,714,092, 7,087,656, 5,153,295, and 4,657,991, and the entire disclosures of each of which are incorporated herein by reference.

Generally, the liquid polysilocarb precursor formulation is cured to form a solid or semi-sold material, e.g., cured material, green material, or plastic material. This material may be further cured, under predetermined conditions. The material may also be pyrolized under predetermined conditions to form a ceramic material. These processing conditions, and the particular formulations, can typically, contribute to the performance, features and properties of the end product or material. Typically, inhibitors and catalysis, as well as, or in addition to the selection of curing conditions, may be used to determine, contribute to, or otherwise affect, processing conditions, as well as, end properties of the material.

Turning now to FIG. 1 there is a schematic, perspective, partially transparent (phantom lines) view of an embodiment of a nanocomposite material 100 made from a first component 101 (being in a first state), a second component 101*a* (being the same basic compound, element or material, as the first component 101, but in a different state from the first component 101), a third component 103 and a fourth component 104.

For the purposes of illustration, and simplification, the components 101, 101*a*, 103, 104 are shown as being spaced apart from one another. It being understood that in embodiments of the nanocomposites the components typically will be in close proximity, and in fact touching, interspersed, interwoven, bonded (covalent, ionic, Van der Waals or other), overlaying, adjacent, commixed, layered, and combinations and variations of these and other configurations. In embodiments of the nanocomposite, the components, essential fill, fill, and preferably entirely fill, the entire volume of the nanocomposite material.

Some of the components can be on, form, or make up a part of the surface of the nanocomposite material 100. Thus, component 101 has surface 105 that forms a part of surface 106 of the nanocomposite material 100.

Figure 1A:
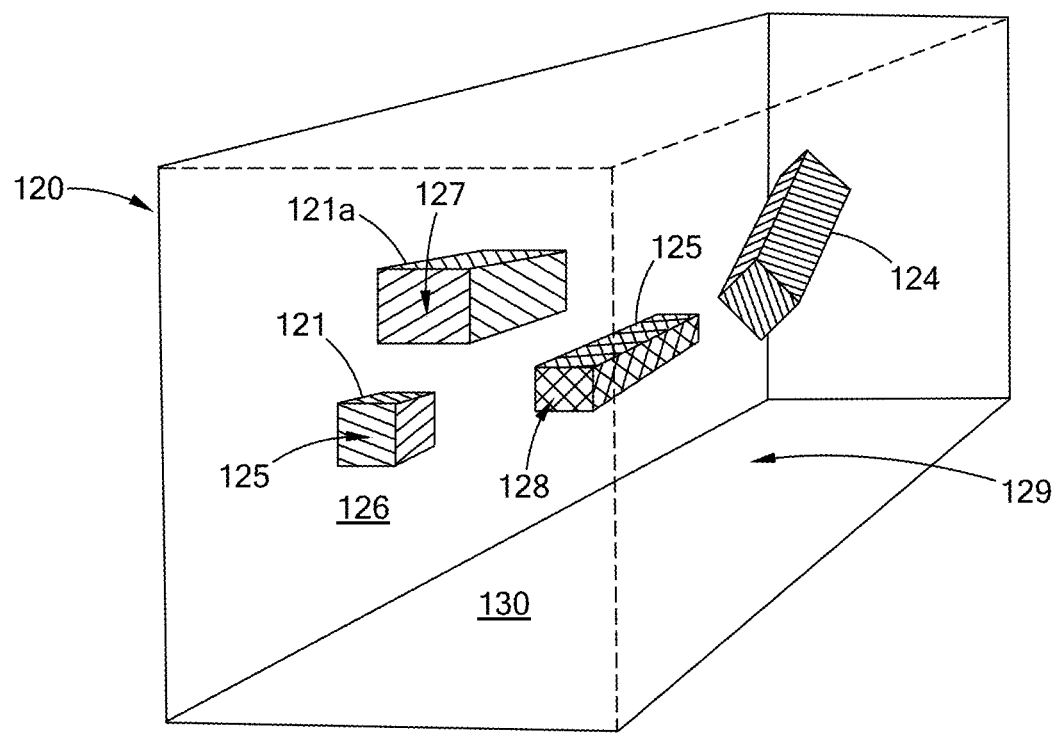
FIG. 1A is a perspective schematic view of an embodiment of a nanocomposite material in accordance with the present inventions.

Turning now to FIG. 1A there is a schematic, perspective, partially transparent (phantom lines) view of an embodiment of a nanocomposite material 120 made from a first component 121 (being in a first state), a second component 121*a* (being the same basic compound, element or material, as the first component 121, but in a different state from the first component 121), a third component 123 and a fourth component 124. The components 121, 121*a*, 123, 124 constitute the dispersed phase of nanocomposite 120 with component 129 constituting the matrix phase.

For the purposes of illustration, and simplification, the components 121, 121*a*, 123, 124 are shown as being widely spaced apart within the matrix phase component 129. It being understood that in embodiments of the nanocomposites the dispersed phase components typically will be in closer proximity, and in fact maybe touching, interspersed, interwoven, bonded (covalent, ionic, Van der Waals or other), overlaying, adjacent, commixed, layered, and combinations and variations of these and other configurations with respect to each other and the component making up the matrix phase. In embodiments of the nanocomposite, the dispersed phase components can range from widely dispersed or separated to essentially filling the matrix phase.

Some of the components can be on, form, or make up a part of the surface 126 of the nanocomposite material 120. Thus, component 121 has surface 125, component 121*a* has surface 127, component 123 has surface 128, the matrix phase component 129 has surface 130, which each form a part of surface 126 of the nanocomposite material 120.

The nanocomposites of the embodiments of FIGS. 1 and 1A, as well as other examples of nanocomposites can also form, be, or be a part of, a macrostructure.

In embodiments of the nanocomposite, the surfaces of some, or all of the components, as well as, the surface of the nanocomposite can have varied, predetermined and engineered surface features, e.g., properties. The surface features can be the same, different, the same but of different degrees (e.g., various degrees of roughness, various contact angles) and combinations and variations of these and other features. The surface features may include, for example, hydrophilicity, hydrophobicity, contact angle, polarity, various electrical properties, thermal properties, color, reflectiveness, UV resistance, UV absorbance, other optical features or properties, hardness, roughness, smoothness, strength, oil absorptivity, absorptivity, stress-strain properties, catalytic reactivity, potential, friction, index of refraction, permeability, surface area, conductivity, and combinations and variations of these and other features. Further, the surface of the nanocomposite material can be coated or treated to provide added or varied functionality. In an embodiment the surface components of the nanocomposite have surface features that make them receptive to, or provide the ability to accommodate or facilitate later treatments, e.g., to provide binding or receptive sites for a coating.

In embodiments of the nanocomposite, the material is free from nano-voids, i.e., a nano-void-free material. By a nanovoid-free material it is meant that the material, e.g., its micro-structure, has no readily detectable voids, e.g., there are no voids having a cross section larger than about 0.01 µm, larger than about 0.001 µm, and larger than about 0.0001 µm. Such a material, while being nano-void free may nevertheless be formed into a macro-structure having porosity (open, closed or both). Thus, for example, in a filter (the macro-structure) can be made of an embodiment of a nano-void-free nanocomposite material, and the filter can have an open pour structure having a porosity of, for example, 0.2 µm.

In embodiments of the nanocomposite, the material has nano-voids, i.e., a nano-void material. For example, the nano-voids are present in the micro-structure of the nanocomposite material; they may be present between the components, within the bulk phase, within the dispersed phase, and combinations and variations of these and other features. The nano-voids have cross sections that are generally from about 0.01 µm to about 0.0001 µm, from about 0.01 µm to about 0.001 µm, from about 0.1 µm to about 0.0001 µm, from about 0.001 µm to about 0.0005 µm, less than about 0.01 µm, less than about 0.001 µm, and less than about 0.0001 µm. Further, the nano-voids may be uniformly distributed throughout the material, they may be randomly distributed throughout the material, they may be distributed in a predetermine manner throughout the material (such as in a gradient with larger numbers of voids being near the surface, and lesser numbers near the center, or in zones or bands of various density), the nano-voids may all have essentially the same cross section or be essentially the same size, they may have different sizes, they may be same or have different shapes (e.g., spherical, tubular, or have various degrees of tortuosity) and combinations and variations of these and other properties.

Referring to FIGS. 2A to 2D there are shown nanocomposite materials 200, 201, 202 and 203 (respectively) being subject to various forces, e.g., stresses. As a result of these stresses, the nanocomposite can be said to strain, e.g., deform, bend, fracture, etc. As used herein, unless specifically provided otherwise, the term stress refers to the force or forces applied over an area to the material, and the term strain refers to the changes that take place in, or to, that material, e.g., changes in size, shape, volume, as a result of a stress.

Figure 2A:
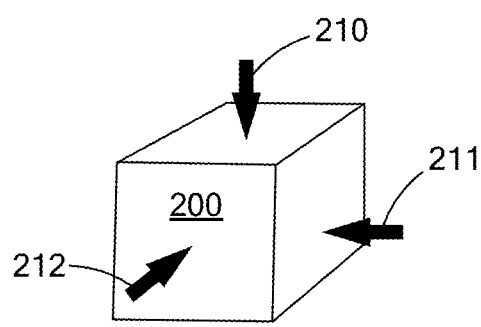
FIG. 2A is perspective view of an embodiment of a nanocomposite material under a confining stress in accordance with the present inventions.
Figure 2B:
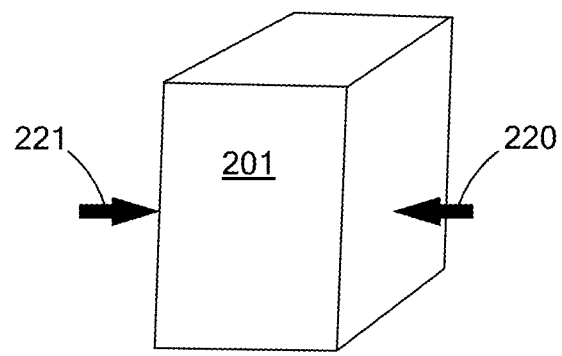
FIG. 2B is perspective view of an embodiment of a nanocomposite material under a compression stress in accordance with the present inventions.
Figure 2C:
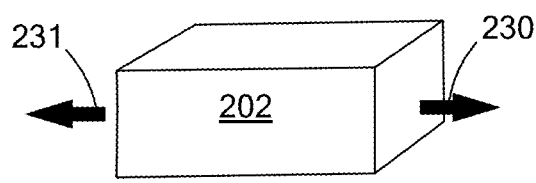
FIG. 2C is perspective view of an embodiment of a nanocomposite material under a tension stress in accordance with the present inventions.
Figure 2D:
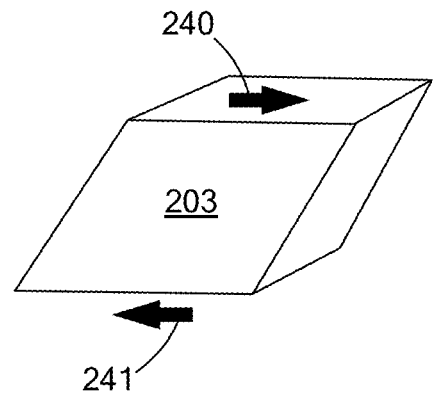
FIG. 2D is perspective view of an embodiment of a nanocomposite material under a shear stress in accordance with the present inventions.

In FIG. 2A the nanocomposite material 200 is being subjected to a confining stress as shown by arrows 210, 211, 212, that is an essentially even stress from all directions (the arrows showing stress from the back and bottom sides of the material 200 are not seen in the drawing). In FIG. 2B the nanocomposite material 201 is being subjected to compressional stress as shown by arrows 220, 221. In FIG. 2C the nanocomposite material 202 is being subjected to tensional stress as shown by arrows 230, 231. In FIG. 2D the nanocomposite material 203 is being subject to shear stress as shown by arrows 240, 241. Other stresses may be applied such as bending, torsion (e.g., twisting), etc. While these stresses are shown in the figures as isolated, one or more of these stresses can be applied to the material in a particular use environment or situation. It should be further recognized that while the present nanocomposite materials can address a particular stress, multiple stresses, types of stress, stresses, and various combinations of stresses, they can also address other environmental and use conditions. Thus, embodiments of the nanocomposite are preferably engineered or designed to address one or more of the conditions of their intended use environment, which can include likely stresses, but can also include factors such as exposure to abrasion, UV light, corrosion, temperature, acids, caustics, density requirements, color requirements, roughness, etc.

Generally, materials respond to stress by straining, or exhibiting strain. This strain, generally can be in the form of elastic deformation (where the strain is reversible), ductile deformation (where the strain is irreversible), and fracture (irreversible strain where the material breaks). It being understood that these are just general properties and that many other strain related material properties, such as necking, etc., can be associated with the behavior of embodiments of the nanocomposite materials. For example, a typical brittle material will have a stress-strain curve with a varying region of elastic behavior but only a small region of ductile behavior before failure. On the other hand, for example, a typical ductile material will have a stress-strain curve that has a small region of elastic behavior, and a large region of ductile behavior before fracture.

Figure 3:
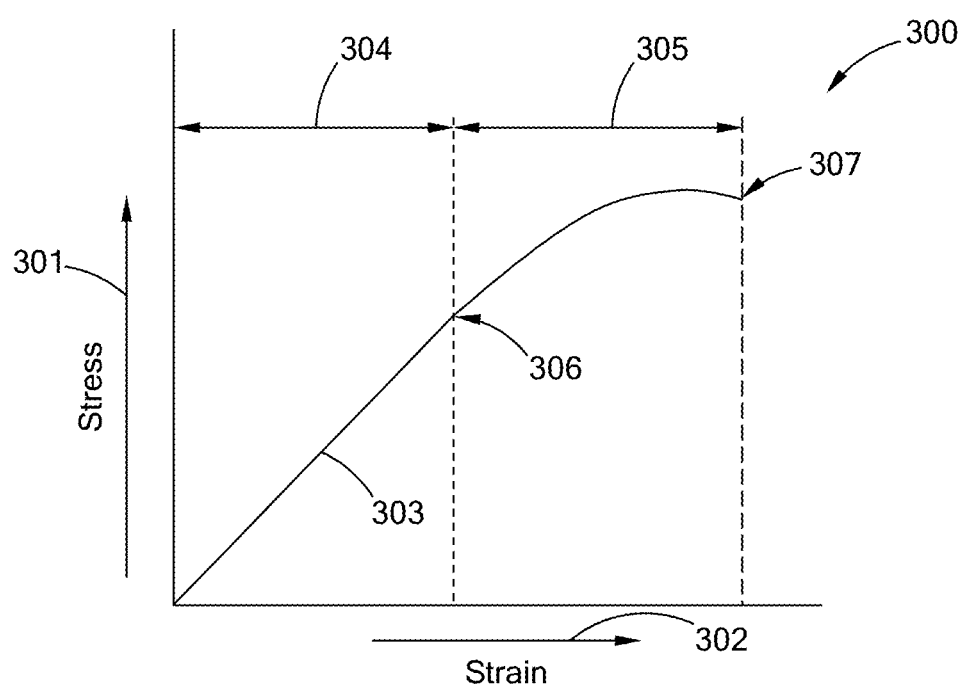
FIG. 3 is a graph of an embodiment of a strain-stress curve for a material.

Thus, turning to FIG. 3, there is provided a graph 300 of the stress-strain curve 303 for a general material. The stress-strain curve plots increasing stress, shown by arrow 301, against increasing strain, shown by arrow 302. The first portion 304 is the elastic deformation section of the curve 303. The second portion 305 is the ductile deformation section of the curve 303. The fracture point 307 and the transition point 306 between elastic deformation 304 and ductile deformation 305 are also shown. It should be understood that this plot is a generalization of stress-strain behavior, and that may different, more complex, and simpler curves may be obtained for different materials and under different conditions, e.g., temperature.

Thus, embodiments of the nanocomposites, and the macrostructures that they can form, can be engineered, predetermined or designed to have particular stress-strain properties, strength, hardness, temperature properties, chemical and corrosion resistivity properties, electrical properties (e.g., conductivity, resistivity), color, hydrophobicity, hydrophilicity, smoothness, roughness, reflectivity, absorptivity, other optical properties, to name a few. In preferred embodiments, the nanocomposite's micro-structure generally imparts, at least in part, these properties to the material.

Embodiments of the nanocomposites can have sections (e.g., zones, layers, areas) having different predetermined, e.g., engineered or designed, properties. In preferred embodiments the nanocomposite's micro-structure imparts, at least in part, the properties to these sections.

Similarly, several nanocomposites, some or all each having different and predetermined properties, can be combined into an embodiment of a single macro-structure. A single nanocomposite having predetermined properties can be made into, or make up, an embodiment of a single macro-structure.

Figure 4:
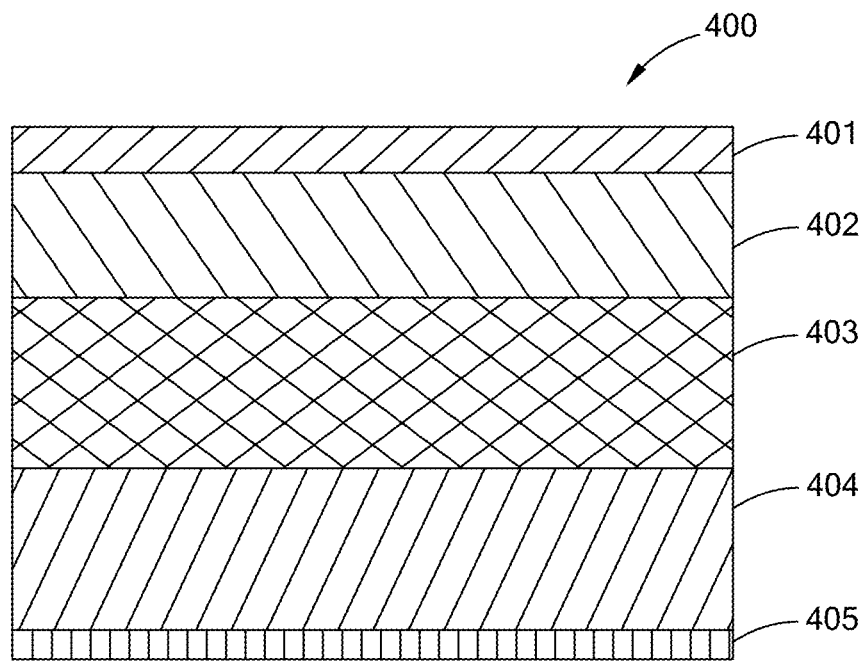
FIG. 4 is schematic cross section of a macro-structure having sections of nanocomposite materials in accordance with the present inventions
Figure 5:
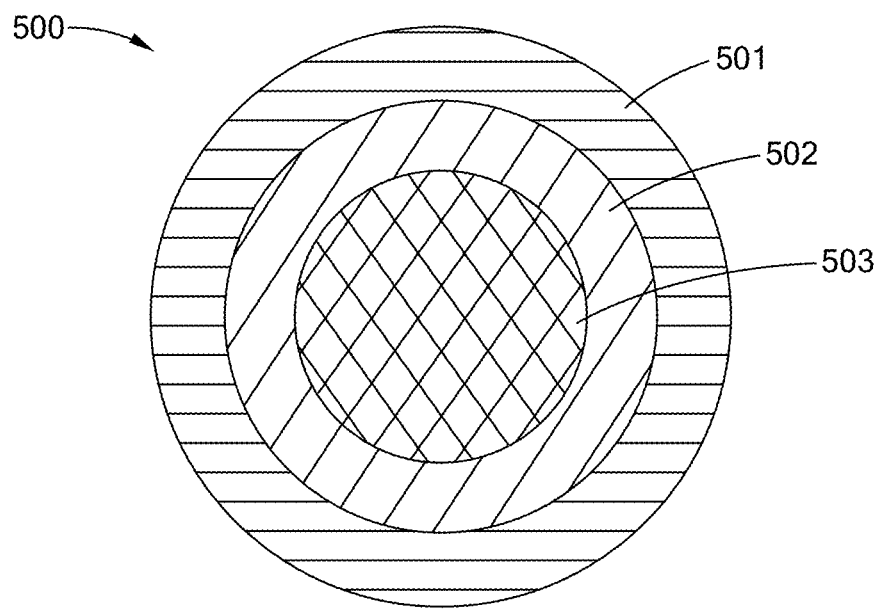
FIG. 5 is a schematic cross section of a macro-structure having sections of nanocomposite materials in accordance with the present inventions
Figure 6:
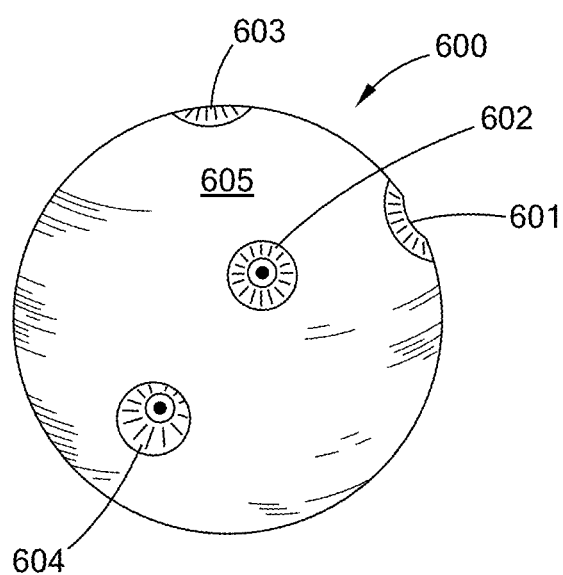
FIG. 6 is perspective view of a macro-structure of a nanocomposite material having strain areas in accordance with the present inventions.
Figure 7A:
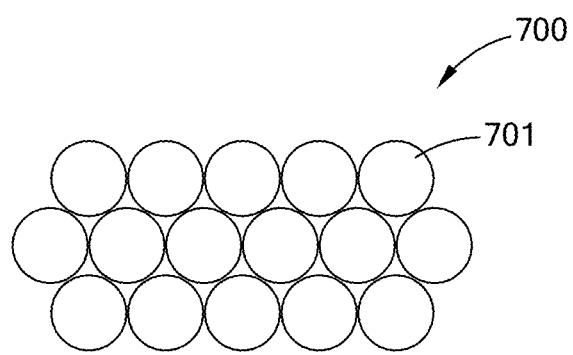
FIG. 7A is a schematic cross section of a pack of macro-structure nanocomposite materials in accordance with the present inventions.
Figure 7B:
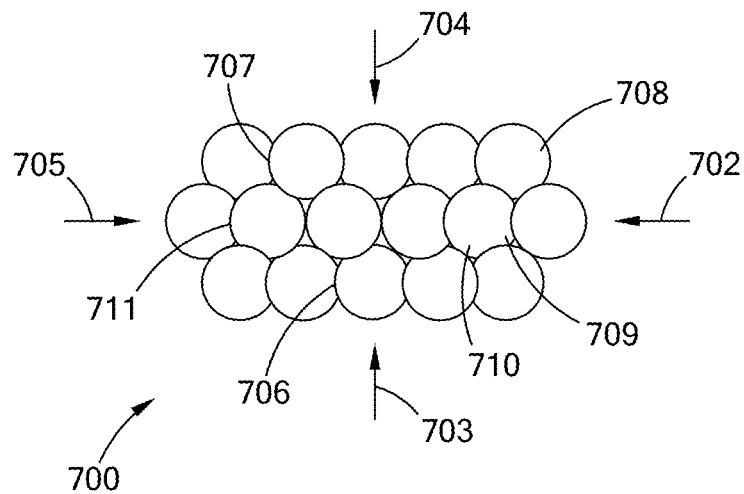
FIG. 7B is a schematic cross section of the pack of FIG. 7A under a confining stress in accordance with the present inventions.

Turning to FIG. 4 there is provided a cross sectional view of a macro-structure of an embodiment of a material of the present invention. The macro-structure 400 has 5 layers 401, 402, 403, 404, 405 of nanocomposite material.

Some or all of the layers 401, 402, 403, 404 and 405 can be made from the same, essentially the same or different nanocomposites. In addition one or more of the layers could be made with a material other than a nano-composite. The layers are shown having different thickness and being planar, stacked, and in an essentially parallel relationship (stacked one atop the other). It being understood that there can be greater or fewer layers (e.g., from a single layer, to 2, to 3, to 6, to 10s, to 100s and more), that the layers can be different thickness, shapes (e.g., wedge shaped, sphere, cup shaped, U shaped, corrugated shape, etc.) and have different orientations, that a layer can encompass or surround another layer, and these and many other configurations.

An embodiment of a nano-composite, for example, a nanocomposite forming one or more layers in the embodiment of FIG. 4, can have one or more of the following features, properties or constituents:
- nano-voids that result in the apparent density of the nanocomposite material to be less than 90%, about 90%-99.99%, about 95%, about 97%, about 99%, and about 99% to 99.99% of the materials actual density;
- nano-void free, e.g., can have no nano-void larger than about 0.01 µm, larger than about 0.001 µm, and larger than about 0.0001 µm (as measured by the largest cross sectional dimension of the nano-void).
- moieties or structures, such as for example: $Si(CH_3)_3O$, 0-20% $SiC_3O$, $SiC_4$, $Si(CH_3)_2O_2$, $SiC_2O_2$, $Si(CH_3)_2(OH)O$, $SiCO_3$, $Si(CH_3)O_3$, $SiO_4$, esters, ketones, aromatic $sp_2$ carbon structures, conjugated aliphatic carbon structures, conjugated aliphatic carbon structures having 2-20 carbons or more carbons, —Si(—C=C—C=C—)$_x$, —C—O—C—, —C—O—Si—, alkanes, terminal end $Si(CH_3)_2O$, —Si—C—C—Si—, $Si(CH_3)_2 O_2$, and $Si(CH_3)O_2$.
- moieties or structures, such as for example: 0-15% $Si(CH_3)_3O$, 0-20% $SiC_3O$, 0-100% $SiC_4$, 0-15% $Si(CH_3)_2O_2$, 0-40% $SiC_2O_2$, 0-10% $Si(CH_3)_2(OH)O$, 0-40% $SiCO_3$, 0-40% $Si(CH_3)O_3$ and 0-80% $SiO_4$ (as preferably determined by $^{29}Si$ solid state Mas NMR). Although, greater and lessor amounts may be present in some embodiments.
- moieties or structures, such as for example: 0-15% $Si(CH_3)_3O$, 0-30% $SiC_3O$, 0-100% $SiC_4$, 0-25% $Si(CH_3)_2O_2$, 0-50% $SiC_2O_2$, 0-20% $Si(CH_3)_2(OH)O$, 0-50% $SiCO_3$, 0-50% $Si(CH_3)O_3$ and 0-100% $SiO_4$ (as preferably determined by $^{29}Si$ solid state Mas NMR). Although, greater and lessor amounts may be present in some embodiments.
- moieties or structures, such as for example: 0-30% esters, 0-30% ketones, 0-80% aromatic $sp_2$ carbon structures having 6 or more carbons, 0-20% —C—O—C—, 0-20% —C—O—Si—, 0-60% alkanes, 0-10% terminal end $Si(CH_3)_2O$, 0-30% —Si—C—C—Si—, 0-20% $Si(CH_3)_2O_2$, and 0-20% $Si(CH_3)O_2$ (as preferably determined by $^{13}C$ solid state mas NMR). Although, greater and lessor amounts may be present in some embodiments.
- apparent densities of less than 2.5 g/cc, less than 2.0 g/cc and less than 1.8 g/cc, and from about 1.6 g/cc to about 2.5 g/cc, from about 1.8 g/cm to about 2.3 g/cm, and from about 1.9 g/cm to about 2.2 g/cm. Although, some embodiments may have greater and lessor apparent densities.
- about 30% to about 60% Si, about 5% to about 40% O, and about 5% to about 45% carbon. Although, greater and lessor amounts may be present in some embodiments.
- about 25% to about 66% Si, about 5% to about 50% O, and about 3% to about 55% carbon. Although, greater and lessor amounts may be present in some embodiments.
- molar ratios of Si, O and C (based on total Si, O and C) for Si of about 0.45 to 1.58, for O of about 0.45 to 1.94 and for C of about 0.30 to 2.21.
- molar ratios of Si, O and C for Si (based on total Si, O and C) of about 0.05 to 2.5, for O of about 0.2 to 2.5 and for C of about 0.1 to 4.5.
- any of the relative amounts of Si, O and C shown in Table 1.

TABLE 1

| | Si | | O | | C | |
|---|---|---|---|---|---|---|
| | Lo | Hi | Lo | Hi | Lo | Hi |
| Wt % | 31.50% | 55.00% | 9.00% | 38.50% | 4.50% | 44.00% |
| Mole Ratio | 0.45 | 1.58 | 0.45 | 1.94 | 0.30 | 2.21 |
| Mole % | 10.60% | 69.50% | 11.40% | 74.40% | 8.50% | 73.30% |

- free carbon, i.e., carbon that is not bound to a Silicon. Preferably, the free carbon is carbon-carbon free carbon, i.e., where the carbon is only bonded to another carbon. The carbon-carbon free carbon can be in several different states, such as for example: turbostratic, amorphous, graphenic, and graphitic. The free carbon can be $sp^2$ or $sp^3$ carbon. For the creation of color, e.g., black material, much large amounts, if not all, $sp^2$ carbon are preferred.
- free carbon domains bound to the matrix, such as, for example a free carbon domain made up of conjugated aliphatic carbon groups (linerar, cyclic or both and having from 2 to about 25 carbon atoms) that is bound to a Silicon at the outer limit, e.g., periphery of the free-carbon domain. In this manner, the free carbon would be tied into the matrix, e.g., the amorphous SiOC matrix, by these periphery carbon silicon bonds.
- the free carbon domains, either the unbound, or tied to the matrix, can have average (e.g., estimated based on Raman spectroscopy data) cross sections of from about, for example, about 6 µm to about 1.5 µm, about 5 µm to about 2.0 µm, about 4.5 µm to about 3.5 µm, about 5.5 µm to about 3.5 µm, about 2.5 µm and greater, about 3.5 µm and greater, about 4 µm and greater, and about 5 µm and greater.
- bound carbon, i.e., carbon that is bound to Silicon. The bound carbon can be in several different states, such as for example: $Si(CH_3)_3O$, $SiC_3O$, $SiC_4$, $Si(CH_3)_2O_2$, $SiC_2O_2$, $Si(CH_3)_2(OH)O_2$, $Si(CH_3)O_3$, $SiCO_3$, esters, ketones, C—O—C, C—O—Si, $Si(CH_3)_2O$, Si—C—C—Si, $Si(CH_3)_2O_2$, $Si(CH_3)O_3$.
- carbon in bound and unbound forms as $sp^2$ carbon, aromatic structures, conjugated structures, bent ring aromatic structures and alkanes.
- relative amounts of bound and free carbon of from about 20% free carbon to about 80% free carbon, and from about 20% bonded carbon to about 80% bonded carbon. Preferably, from about 20% carbon-carbon free carbon to about 80% carbon-carbon free carbon, and from about 20% bonded carbon to about 80% bonded carbon. Although, greater and lesser amounts may also be present. It is recognized that these are "relative amounts" and in some embodiments the structures can include additional moieties, typically, although not necessarily in the dispersed phase, that would include the other additional materials, components and elements.

These moieties and structures can, for example, from a part of, or be in, the matrix phase, the dispersed phase, and both.

Embodiments having preferred amounts of free carbon and Silicon-bound-Carbon (Si—C) are set forth in Table 2.

TABLE 2

| Embodiment | % Free Carbon | % Si—C type |
| --- | --- | --- |
| 1 | 64.86 | 35.14 |
| 2 | 63.16 | 36.85 |
| 3 | 67.02 | 32.98 |
| 4 | 58.59 | 41.41 |
| 5 | 68.34 | 31.66 |
| 6 | 69.18 | 30.82 |
| 7 | 65.66 | 34.44 |
| 8 | 72.74 | 27.26 |
| 9 | 72.46 | 27.54 |
| 10 | 78.56 | 21.44 |

Typically, embodiments of the pyrolized polysilocarb ceramics can have other elements present, such as Nitrogen and Hydrogen. Embodiments can have the amounts of these other materials as set out in Table 3. (Note that these are typical for embodiments of net materials. If fillers, additives, or other materials are combined with or into the precursor formulation; then such materials can generally be present to a greater or lesser extent in the pyrolized ceramic material)

TABLE 3

| | H | | N | |
| --- | --- | --- | --- | --- |
| | Lo | Hi | Lo | Hi |
| Wt % | 0.00% | 2.20% | 0% | 2% |
| Mole Ratio | 0.000 | 1.751 | 0 | 0.1 |
| Mole % | 0.000% | 48.827% | 0% | 3% |

EXAMPLES

The following examples are provided to illustrate various embodiments of systems, processes, compositions, applications and materials of the present inventions. These examples are for illustrative purposes, may be prophetic, and should not be viewed as, and do not otherwise limit the scope of the present inventions. The percentages used in the examples, unless expressly provided otherwise, are weight percents of the total, e.g., formulation, mixture, product, or structure. The usage X/Y or XY indicates % of X and the % of Y in the formulation, unless expressly provided otherwise. The usage X/Y/Z or XYZ indicates the % of X, % of Y and % of Z in the formulation, unless expressly provided otherwise.

Example 1

A SiOC nanocomposite material is free of nano-voids larger than 0.01 μm, has an apparent density of 1.9 g/cc, a crush strength of about 5,000 psi, and has, among potential other moieties, $Si(CH_3)_3O$, $SiC_3O$, and about 25% carbon, of which about 60% is free carbon.

Example 2

A SiOC nanocomposite material is free of nano-voids larger than 0.001 μm, has an apparent density of 2.0 g/cc, a crush strength of about 15,000 psi, and has, among potential other moieties, $SiC_2O_2$, $SiO_4$, —C—O—Si— and about 30% carbon of which about 67% is free carbon.

Example 3

A multilayer structure of nanocomposites is made by forming one layer atop the other. Each layer can be formed by a thin film forming process, such as printing, rotogravure printing, vapor deposition, and the like. Each layer can have predetermined properties, such as band gap, index of refraction, resistivity, conductivity, etc. The layers may be the same, alternating, or arranged in some other fashion based upon the specific and predetermined properties for the layer, where each different number represent a layer having different physical properties, such as 1, 1, 2, 1, 1, 3, 1, 1, 2, 113 . . . or 1, 2, 3, 4, 1, 2, 3, 4 . . . or 1, 2, 3, 1, 1, 1, 3, 4, 5, 1, 1, 1, 1, 2, 3, 1, 1, 1, 3, 4, 5 . . . or 1, 2, 1, 2, 1, 2 . . . or 1, 2, 3, 3, 2, 1 . . . .

Example 4

A precursor formulation is made having 46/34/20 MHF/TV/VT and 1% (of total precursor weight) P01 catalyst. The material is cured about 300-400° C., and then is water soaked for 24 hrs at room temperature, the material is pyrolized under vacuum (<50 mtorr) at 1150° C. for 2 hours, (temperature is ramped up to 1150° C. The material has the NMR data of FIG. 8. The nanocomposite has free carbon domains containing graphitic and trubostratic carbon.

Example 5

A precursor formulation is made having 44/40/20 MHF/TV/VT and 1% (of total precursor weight) P01 catalyst. The material is cured about 300-400° C., and then is water soaked for 24 hrs at room temperature, the material is pyrolized under vacuum (<50 mtorr) at 1150° C. for 2 hours, (temperature is ramped up to 1150° C. over about a 23 hr period). The material has the NMR data of FIG. 9. The nanocomposite has free carbon domains containing graphitic and trubostratic carbon.

Example 6

A precursor formulation is made having 46/34/20 MHF/TV/VT and 1% (of total precursor weight) P01 catalyst. The material is cured about 300-400° C., the material is pyrolized under vacuum (<50 mtorr) at 1150° C. for 2 hours, (temperature is ramped up to 1150° C. The material has the NMR data of FIG. 10. The nanocomposite has free carbon domains containing graphitic and trubostratic carbon.

Example 7

A precursor formulation is made having 46/34/20 MHF/TV/VT and 1% (of total precursor weight) P01 catalyst. The material is cured about 300-400° C., the cured material is maintained under vacuum, the material is pyrolized under vacuum (<50 mtorr) at 1150° C. for 2 hours, (temperature is ramped up to 1150° C. The material has the NMR data of FIG. 11. The nanocomposite has free carbon domains containing graphitic and trubostratic carbon.

Example 8

A precursor formulation is made having 46/34/20 MHF/TV/VT and 1% (of total precursor weight) P01 catalyst. The material is cured about 300-400° C., the cured material is water soaked, the material is pyrolized under vacuum (<50 mtorr) at 1150° C. for 2 hours, (temperature is ramped up to 1150° C. The material has the NMR data of FIG. 12. The nanocomposite has free carbon domains containing graphitic and trubostratic carbon.

Example 9

Figure 13A:
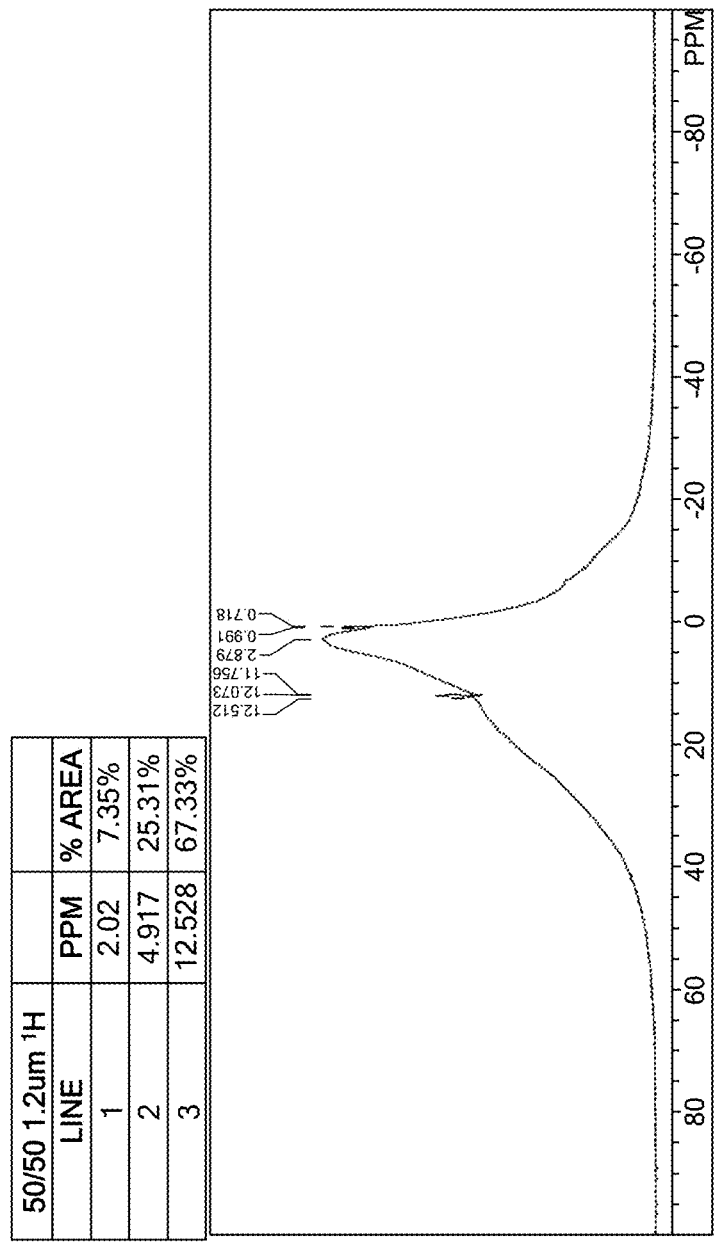
FIG. 13A is a table of area under peaks, corresponding relative amounts of moieties, and other NMR based data for an embodiment of a nanocomposite, 50/50 MHF/DCPD particle size 1.2 μm, in accordance with the present inventions determined by $^1$H solid state mas NMR; and the NMR spectra for this data.
Figure 13B:
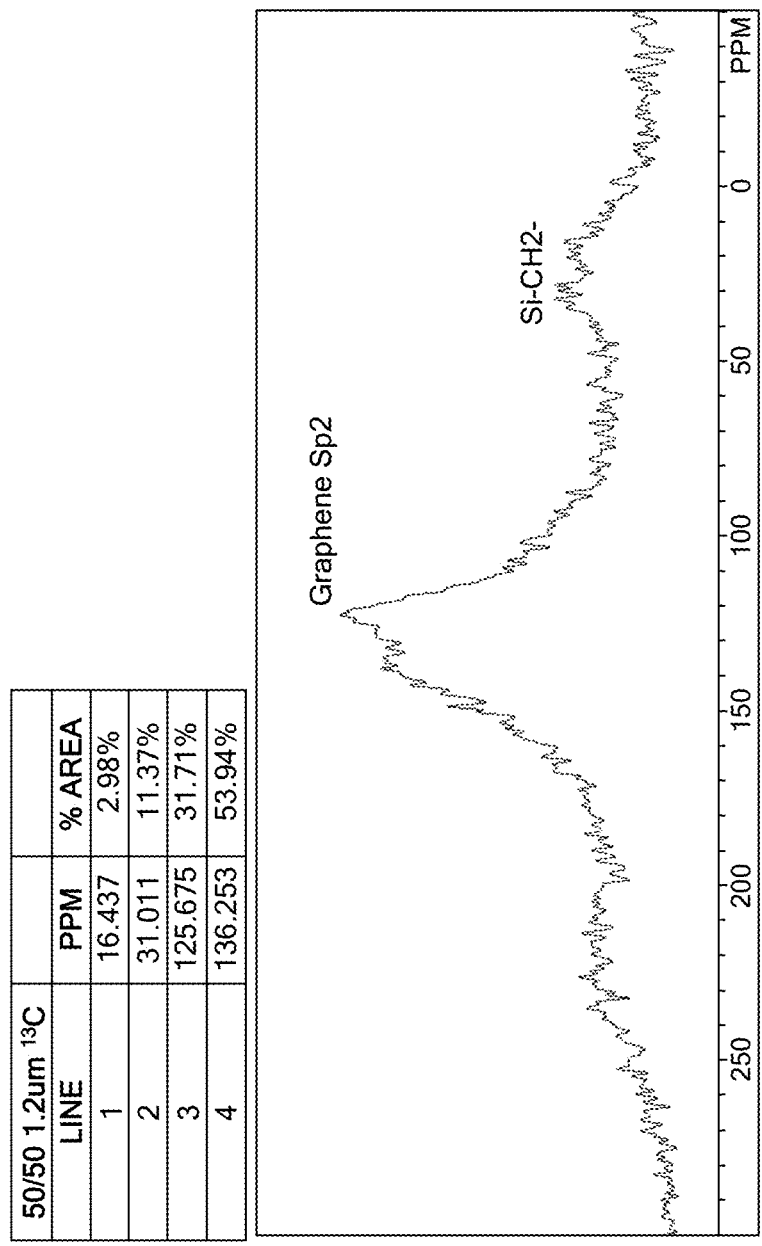
FIG. 13B is a table of area under peaks, corresponding relative amounts of moieties, and other NMR based data for an embodiment of a nanocomposite, 50/50 MHF/DCPD particle size 1.2 μm, in accordance with the present inventions determined by $^{13}$C solid state mas NMR; and the NMR spectra for this data.
Figure 13C:
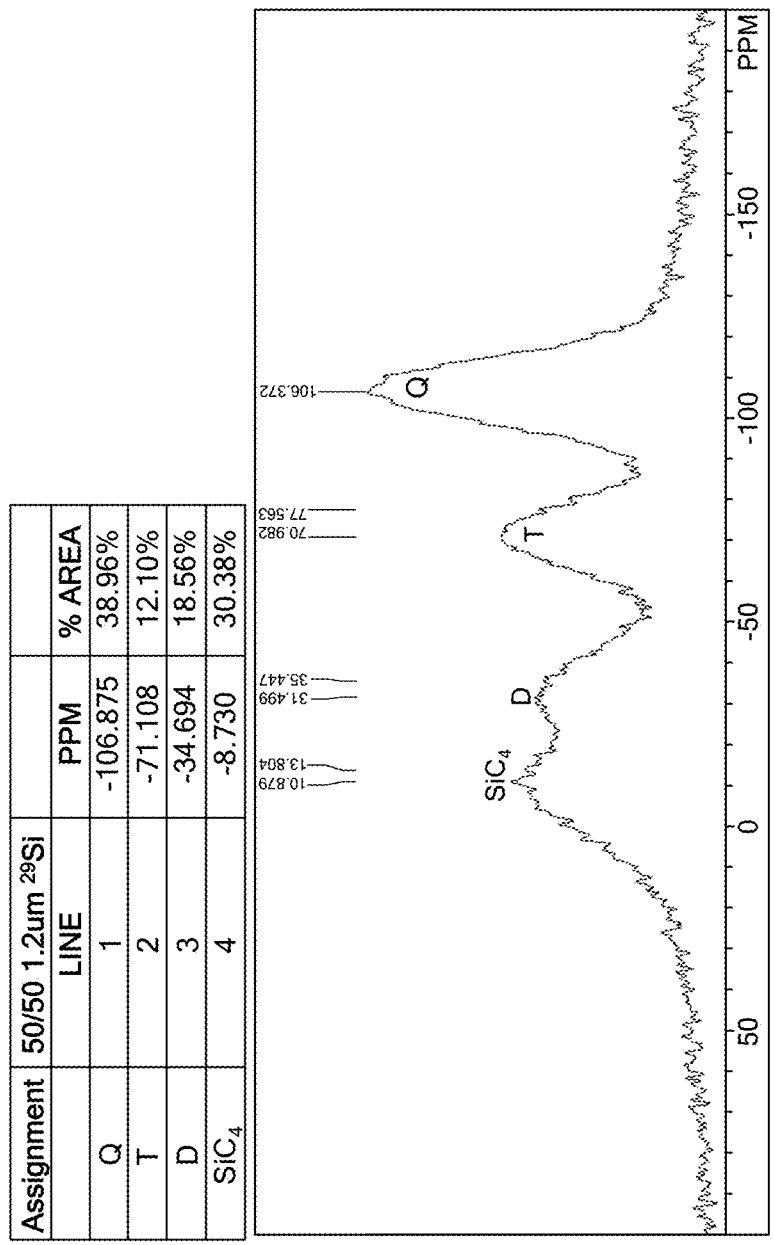
FIG. 13C is a table of area under peaks, corresponding relative amounts of moieties, and other NMR based data for an embodiment of a nanocomposite, 50/50 MHF/DCPD particle size 1.2 μm, in accordance with the present inventions determined by $^{29}$Si solid state mas NMR; and the NMR spectra for this data.

FIGS. 13A, 13B, 13C are NMR data and spectra for a nanocomposite made from a 50/50 MHF/DCPD precursor. The spectra and data show the presence of graphitic sp$^2$ carbon, believe to be as fee carbon domains. The macro-particle size for these nanocomposite materials was 1.2 μm.

Example 10

Figure 14:
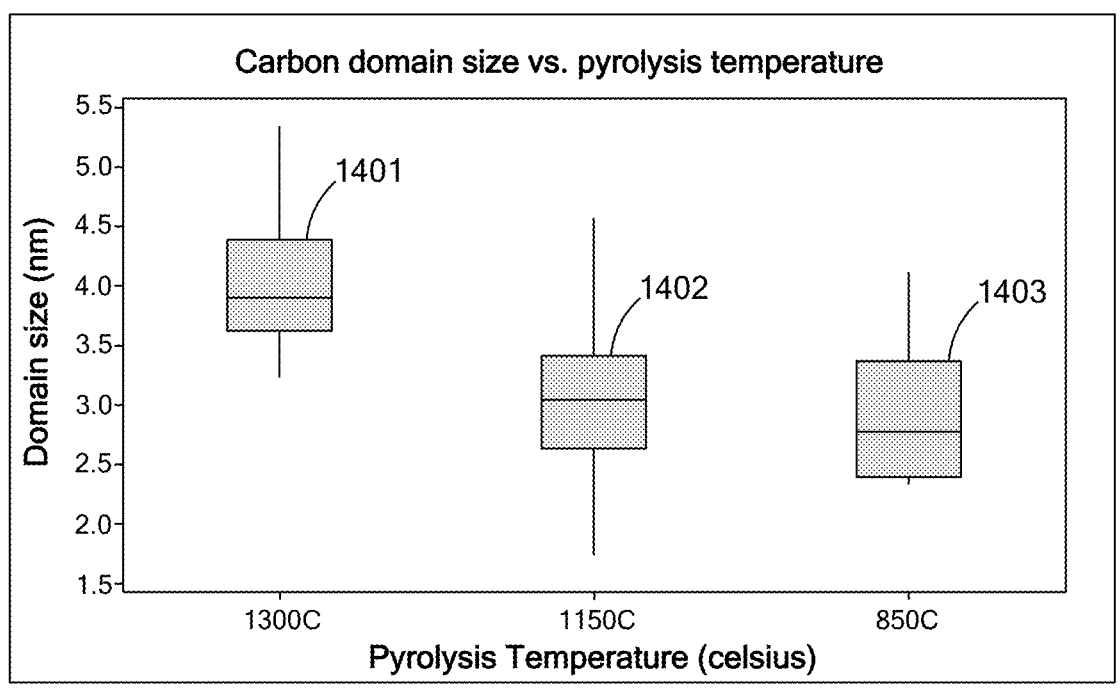
FIG. 14 is a chart of free carbon domain size vs pyrolysis temperature for an 50/50 MHF/DCPD nanocomposite material embodiment in accordance with the present inventions.

A precursor batch of 50/50 MHF/DCPD was cured and then pyrolized at different temperatures and durations (all other conditions remaining the same). Turning to FIG. 14 the size range of the free carbon domains for the nanocomposite cured at 850° C. for 2 hrs, is show as box 1403. The size range for the free carbon domains for the nanocomposite cured at 1150° C. for 5.5 hrs is shown as box 1404. The size range for the free carbon domains for the nanocomposite cured at 1300° C. for 10 hrs is shown as box 1404. Thus, it is theorized that high temperature cures will result in larger free carbon domain sizes.

Example 11

Turning to FIGS. 15A to 15H there are provided tables showing the free carbon domain size for the nanocomposite materials and pyrolysis temperatures shown in the tables.

Example 12

Figure 16:
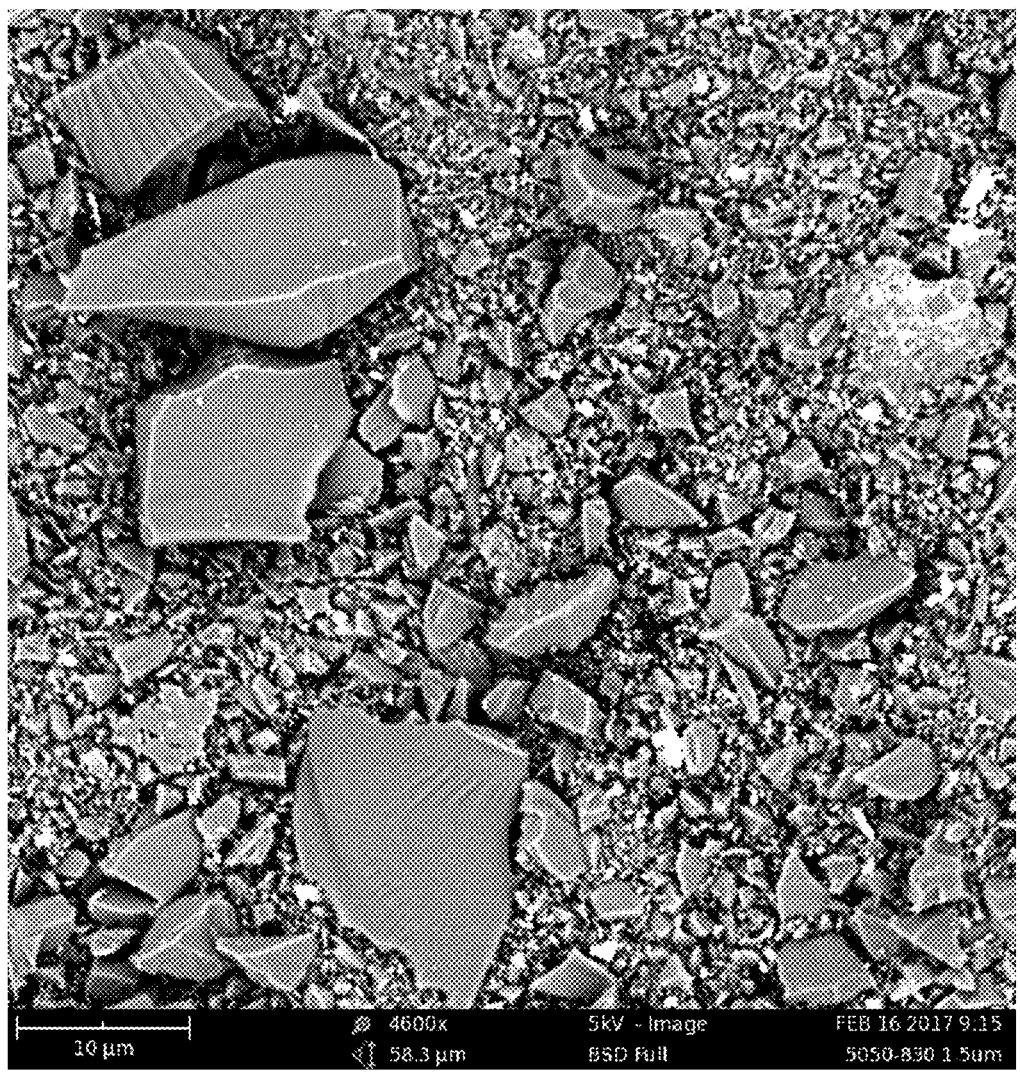
FIG. 16 is an SEPM of an embodiment of nanocomposite material, 50/50 MHF/DCPD nanocomposite, with a particle size 1.5 µm (SEPM-legend: scale bar 10 µm, 4600×, 5 kV, view double arrow 58.3 µm. BSD Full), in accordance with the present inventions.

In FIG. 16 there is provided an SEPM of a macrostructure of a nanocomposite having an amorphous SiOC matrix with free carbon domains, having sp$^2$ carbon, bound at the domain's periphery of to the Si. In an embodiment, it is theorized that the linkage between the SIOC matrix and the free carbon domains would be in the form of —S—C=C—(C=C—)$_x$, where x can be from 0 to 20, by way of example.
Overview—Polysilocarb Formulations, Methods & Materials Formulations, processes, methods of making, and compositions for various polysilocarbs are taught and disclosed in U.S. Pat. Nos. 9,499,677, 9,481,781 and US Patent Publication Nos. 2014/0274658, 2014/0323364, 2015/0175750, 2016/0207782, 2016/0280607, 2017/0050337, the entire disclosure of each of which are incorporated herein by reference.

General Processes for Obtaining a Polysilocarb Precursor

Typically, polymer derived ceramic precursor formulations, and in particular, polysilocarb precursor formulations, can generally be made by three types of processes, although other processes, and variations and combinations of these processes may be utilized. These processes generally involve combining precursors to form a precursor formulation. One type of process generally involves the mixing together of precursor materials in preferably a solvent free process with essentially no chemical reactions taking place, e.g., "the mixing process." The other type of process generally involves chemical reactions, e.g., "the reaction type process," to form specific, e.g., custom, precursor formulations, which could be monomers, dimers, trimers and polymers. A third type of process has a chemical reaction of two or more components in a solvent free environment, e.g., "the reaction blending type process." Generally, in the mixing process essentially all, and preferably all, of the chemical reactions take place during subsequent processing, such as during curing, pyrolysis and both.

It should be understood that these terms—reaction type process, reaction blending type process, and the mixing type process—are used for convenience and as a short hand reference. These terms, i.e., process types, are not, and should not be viewed as, limiting. For example, the reaction type process can be used to create a precursor material that is then used in the mixing type process with another precursor material.

These process types are described in this specification, among other places, under their respective headings. It should be understood that the teachings for one process, under one heading, and the teachings for the other processes, under the other headings, can be applicable to each other, as well as, being applicable to other sections, embodiments and teachings in this specification, and vice versa. The starting or precursor materials for one type of process may be used in the other type of processes. Further, it should be understood that the processes described under these headings should be read in context with the entirely of this specification, including the various examples and embodiments.

It should be understood that combinations and variations of these processes may be used in reaching a precursor formulation, and in reaching intermediate, end, and final products. Depending upon the specific process and desired features of the product, the precursors and starting materials for one process type can be used in the other. A formulation from the mixing type process may be used as a precursor, or component in the reaction type process, or the reaction blending type process. Similarly, a formulation from the reaction type process may be used in the mixing type process and the reaction blending process. Similarly, a formulation from the reaction blending type process may be used in the mixing type process and the reaction type process. Thus, and preferably, the optimum performance and features from the other processes can be combined and utilized to provide a cost effective and efficient process and end product. These processes provide great flexibility to create custom features for intermediate, end, and final products, and thus, any of these processes, and combinations of them, can provide a specific predetermined product. In selecting which type of process is preferable, factors such as cost, controllability, shelf life, scale up, manufacturing ease, etc., can be considered.

The precursor formulations may be used to form a "neat" material (by "neat" material it is meant that all, and essentially all of the structure is made from the precursor material or unfilled formulation; and thus, for example, there are no fillers or reinforcements). The precursor formulations may be used to form a filled material, e.g., having an additive or other material in addition to the precursors. They may be used to form composite materials, e.g., structures or coatings having other materials such as reinforcements in them. They may be used to form non-reinforced materials, which are materials that are made of primarily, essentially, and preferably only from the precursor materials, e.g., minimally filled materials where the filler is not intended to add or enhance strength, and unfilled materials. They may be sued to form reinforced materials, for example materials having fibers or other materials to add strength, abrasion resistance, durability, or other features or properties, that generally are viewed as strength related in a broad sense.

In general, types of filler material include, for example: inert fillers, such as inorganic materials that do not react with the SiOC matrix during curing, pyrolysis or use; reactive fillers, such as zirconium, aluminum hydroxide, and boron compounds that react with the SiOC matrix during curing, pyrolysis, use, or combinations of these; and, active fillers, such as materials that are released during the use of the end product to provide specific features to that product, e.g., lubricant. A filler may come under more than one of these types.

The filler material may also be made from, or derived from the same material as the formulation that has been formed into a cured or pyrolized solid, or it may be made from a different precursor formulation material, which has been formed into a cured solid or semi-solid, or pyrolized solid.

The polysilocarb formulation and products derived or made from that formulation may have metals and metal complexes. Thus, metals as oxides, carbides or silicides can be introduced into precursor formulations, and thus into a silica matrix in a controlled fashion. For example, organometallic, metal halide (chloride, bromide, iodide), metal alkoxide and metal amide compounds of transition metals can be copolymerized in the silica matrix, through incorporation into a precursor formulation.

The filler material can impart, regulate or enhance, features and properties, for example, electrical resistance, magnetic capabilities, band gap features, p-n junction features, p-type features, n-type features, dopants, electrical conductivity, semiconductor features, anti-static, optical properties (e.g., reflectivity, refractivity and iridescence), chemical resistivity, corrosion resistance, wear resistance, abrasions resistance, thermal insulation, UV stability, UV protective, and other features or properties that may be desirable, necessary, and both, in the end product or material.

Thus, filler materials could include copper lead wires, thermal conductive fillers, electrically conductive fillers, lead, optical fibers, ceramic colorants, pigments, oxides, dyes, powders, ceramic fines, polymer derived ceramic particles, pore-formers, carbosilanes, silanes, silazanes, silicon carbide, carbosilazanes, siloxane, metal powders, ceramic powders, metals, metal complexes, carbon, tow, fibers, staple fibers, boron containing materials, milled fibers, glass, glass fiber, fiber glass, and nanostructures (including nanostructures of the forgoing) to name a few. For example, crushed, polymer derived ceramic particles, e.g., fines or beads, can be added to a polysilocarb formulation and then cured to form a filled cured plastic material, which has significant fire resistant properties as a coating or in a device or component of a device.

The polysilocarb precursor formulations may be used with reinforcing materials to form composite layers or coatings. Thus, for example, the formulation may be flowed into, impregnated into, absorbed by or otherwise combined with a thin reinforcing material, such as carbon fibers, glass fiber, woven fabric, non-woven fabric, copped fibers, fibers, rope, braided structures, ceramic powders, glass powders, carbon powders, graphite powders, ceramic fibers, metal powders, carbide pellets or components, staple fibers, tow, nanostructures of the above, PDCs, any other material that meets the temperature requirements of the process and end product, and combinations and variations of these. Thus, for example, the reinforcing materials may be any of the high temperature resistant reinforcing materials currently used, or capable of being used with, existing plastics and ceramic composite materials. Additionally, because the polysilocarb precursor formulation may be formulated for a lower temperature cure (e.g., SATP) or a cure temperature of for example about 37.8° C. (100° F.) to about 204.4° C. (400° F.), the reinforcing material may be polymers, organic polymers, such as nylons, polypropylene, and polyethylene, as well as aramid fibers, such as NOMEX or KEVLAR.

The reinforcing material may also be made from, or derived from the same material as the formulation that has been formed into a fiber, cured into a solid, pyrolized into a ceramic, or it may be made from a different precursor formulation material, which has been formed into a fiber, pyrolized into a ceramic and combinations and variations of these. In addition to ceramic fibers derived from the precursor formulation materials that may be used as reinforcing material, other porous, substantially porous, and non-porous ceramic structures derived from a precursor formulation material may be used.

The polysilocarb material (e.g., precursor batch, precursor, formulation, bulk liquid, etc.), can have various inhibitors, catalysts and initiator present that inhibit, regulate, or promote curing, under predetermined conditions. Thus, the polysilocarb coating material can have sufficient inhibitors present, or the absence of a catalyst, to provide the required shelf life for the material in storage.

The Mixing Type Process

Precursor materials may be a methyl hydrogen (methyl terminated hydride substituted polysiloxane), methyl hydrogen fluid (methyl terminated hydride methyl substitute polysiloxane, with little to no dimethyl groups) and substituted and modified methyl hydrogens, siloxane backbone materials, siloxane backbone additives, reactive monomers, reaction products of a siloxane backbone additive with a silane modifier or an organic modifier, and other similar types of materials, such as silane based materials, silazane based materials, carbosilane based materials, non-silicon based organic cross linkers, phenol/formaldehyde based materials, and combinations and variations of these. The precursors are preferably liquids at room temperature, although they may be solids that are melted, or that are soluble in one of the other precursors. (In this situation, however, it should be understood that when one precursor dissolves another, it is nevertheless not considered to be a "solvent" as that term is used with respect to the prior art processes that employ non-constituent solvents, e.g., solvents that do not form a part or component of the end product, are treated as waste products, and both.)

The precursors are mixed together in a vessel, preferably at room temperature. Preferably, little, and more preferably no solvents, e.g., water, organic solvents, polar solvents, non-polar solvents, hexane, THF, toluene, are added to this mixture of precursor materials. Preferably, each precursor material is miscible with the others, e.g., they can be mixed at any relative amounts, or in any proportions, and will not separate or precipitate. At this point the "precursor mixture" or "polysilocarb precursor formulation" is compete (noting that if only a single precursor is used the material would simply be a "polysilocarb precursor" or a "polysilocarb precursor formulation" or a "formulation"). Although complete, fillers and reinforcers may be added to the formulation. In preferred embodiments of the formulation, essentially no, and more preferably no chemical reactions, e.g., crosslinking or polymerization, takes place within the formulation, when the formulation is mixed, or when the formulation is being held in a vessel, on a prepreg, or over a time period, prior to being cured.

The precursors can be mixed under numerous types of atmospheres and conditions, e.g., air, inert, $N_2$, Argon, flowing gas, static gas, reduced pressure, elevated pressure, ambient pressure, and combinations and variations of these.

Additionally, inhibitors such as cyclohexane, 1-Ethynyl-1-cyclohexanol which may be obtained from ALDRICH), Octamethylcyclotetrasiloxane (which may be viewed as a dilutant), and tetramethyltetravinylcyclotetrasiloxane, may be added to the polysilocarb precursor formulation, e.g., to form an inhibited polysilocarb precursor formulation. It should be noted that tetramethyltetravinylcyclotetrasiloxane may act as both a reactant and a reaction retardant (e.g., an inhibitor), depending upon the amount present and temperature, e.g., at room temperature it is a retardant and at elevated temperatures it is a reactant. Other materials, as well, may be added to the polysilocarb precursor formulation, e.g., a filled polysilocarb precursor formulation, at this point in processing, including fillers such as SiC powder, carbon black, sand, polymer derived ceramic particles, pigments, particles, nano-tubes, whiskers, or other materials, discussed in this specification or otherwise known to the arts. Further, a formulation with both inhibitors and fillers would be considered an inhibited, filled polysilocarb precursor formulation.

A catalyst or initiator may be used, and can be added at the time of, prior to, shortly before, or at an earlier time before the precursor formulation is formed or made into a structure, prior to curing. The catalysis assists in, advances, and promotes the curing of the precursor formulation to form a cured material or structure.

The catalyst can be any platinum (Pt) based catalyst, which can, for example, be diluted to ranges of: about 0.01 parts per million (ppm) Pt to about 250 ppm Pt, about 0.03 ppm Pt, about 0.1 ppm Pt, about 0.2 ppm Pt, about 0.5 ppm Pt, about 0.02 to 0.5 ppm Pt, about 1 ppm to 200 ppm Pt and preferably, for some applications and embodiments, about 5 ppm to 50 ppm Pt. The catalyst can be a peroxide based catalyst with, for example, a 10 hour half life above 90 C at a concentration of between 0.1% to 3% peroxide, and about 0.5% and 2% peroxide. It can be an organic based peroxide. It can be any organometallic catalyst capable of reacting with Si—H bonds, Si—OH bonds, or unsaturated carbon bonds, these catalysts may include: dibutyltin dilaurate, zinc octoate, peroxides, organometallic compounds of for example titanium, zirconium, rhodium, iridium, palladium, cobalt or nickel. Catalysts may also be any other rhodium, rhenium, iridium, palladium, nickel, and ruthenium type or based catalysts. Combinations and variations of these and other catalysts may be used. Catalysts may be obtained from ARKEMA under the trade name LUPEROX, e.g., LUPEROX 231; and from Johnson Matthey under the trade names: Karstedt's catalyst, Ashby's catalyst, Speier's catalyst. Transition metal catalysis, such as Fe catalysis, Ni catalysis, and Co catalysis, that for example are used in the growth of ordered and highly ordered carbon structures, such as carbon nanotubes, can also be used.

Further, custom and specific combinations of these and other catalysts may be used, such that they are matched to specific formulations, and in this way selectively and specifically catalyze the reaction of specific constituents. Moreover, the use of these types of matched catalyst-formulations systems, as well as, process conditions, may be used to provide predetermined product features, such as for example, pore structures, porosity, densities, density profiles, high purity, ultra high purity, and other morphologies or features of cured structures or materials, and in some instances the ceramics that are formed from the cured structures or materials.

In this mixing type process for making a precursor formulation, preferably chemical reactions or molecular rearrangements only take place during the making of the raw starting materials, the curing process, and in the pyrolizing process. Preferably, in the embodiments of these mixing type of formulations and processes, polymerization, cross-linking or other chemical reactions take place primarily, preferably essentially, and more preferably solely during the curing process.

The precursor may be a methyl terminated hydride substituted polysiloxane, which can be referred to herein as methyl hydrogen (MH), having the formula shown below.

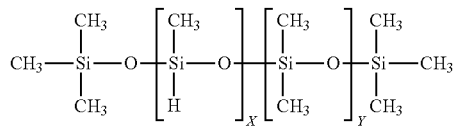

The MH, for example, may have a molecular weight ("mw" which can be measured as weight averaged molecular weight in amu or as g/mol) from about 400 mw to about 10,000 mw, from about 600 mw to about 3,000 mw, and may have a viscosity preferably from about 20 cps to about 60 cps. The percentage of methylsiloxane units "X" may be from 1% to 100%. The percentage of the dimethylsiloxane units "Y" may be from 0% to 99%. This precursor may be used to provide the backbone of the cross-linked structures, as well as, other features and characteristics to the cured preform and ceramic material. This precursor may also, among other things, be modified by reacting with unsaturated carbon compounds to produce new, or additional, precursors. Typically, methyl hydrogen fluid (MHF) has minimal amounts of "Y", and more preferably "Y" is for all practical purposes zero.

The precursor may be any of the following linear siloxane backbone materials.

The precursor may be a vinyl substituted polydimethyl siloxane, which formula is shown below.

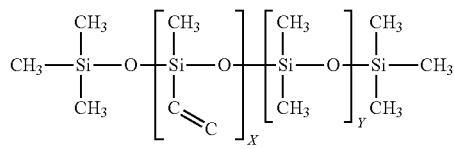

This precursor, for example, may have a molecular weight (mw) from about 400 mw to about 10,000 mw, and may have a viscosity preferably from about 50 cps to about 2,000 cps. The percentage of methylvinylsiloxane units "X" may be from 1% to 100%. The percentage of the dimethylsiloxane units "Y" may be from 0% to 99%. Preferably, X is about 100%. This precursor may be used to increase cross-link density and improve toughness, as well as, other features and characteristics to the cured preform and ceramic material.

The precursor may be a vinyl substituted and vinyl terminated polydimethyl siloxane, which formula is shown below.

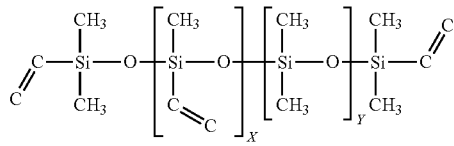

This precursor, for example, may have a molecular weight (mw) from about 500 mw to about 15,000 mw, and may preferably have a molecular weight from about 500 mw to 1,000 mw, and may have a viscosity preferably from about 10 cps to about 200 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be a vinyl substituted and hydrogen terminated polydimethyl siloxane, which formula is shown below.

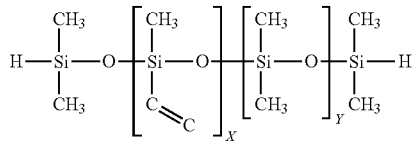

This precursor may have a molecular weight (mw) from about 300 mw to about 10,000 mw, and may preferably have a molecular weight from about 400 mw to 800 mw, and may have a viscosity preferably from about 20 cps to about 300 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be an allyl terminated polydimethyl siloxane, which formula is shown below.

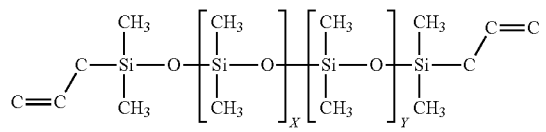

This precursor may have a molecular weight (mw) from about 400 mw to about 10,000 mw, and may have a viscosity preferably from about 40 cps to about 400 cps. The repeating units are the same. This precursor may be used to provide UV curability and to extend the polymeric chain, as well as, other features and characteristics to the cured preform and ceramic material.

The precursor may be a vinyl terminated polydimethyl siloxane (VT), which formula is shown below.

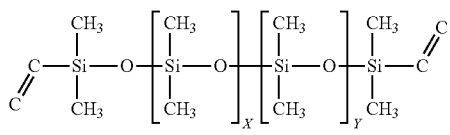

This precursor may have a molecular weight (mw) from about 200 mw to about 5,000 mw, and may preferably have a molecular weight from about 400 mw to 1,500 mw, and may have a viscosity preferably from about 10 cps to about 400 cps. The repeating units are the same. This precursor may be used to provide a polymeric chain extender, improve toughness and to lower cure temperature down to for example room temperature curing, as well as, other features and characteristics to the cured preform and ceramic material.

The precursor may be a silanol (hydroxy) terminated polydimethyl siloxane, which formula is shown below.

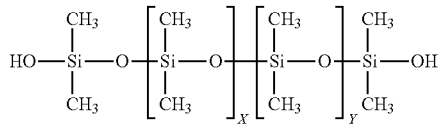

This precursor may have a molecular weight (mw) from about 400 mw to about 10,000 mw, and may preferably have a molecular weight from about 600 mw to 1,000 mw, and may have a viscosity preferably from about 30 cps to about 400 cps. The repeating units are the same. This precursor may be used to provide a polymeric chain extender, a toughening mechanism, can generate nano- and micro-scale porosity, and allows curing at room temperature, as well as other features and characteristics to the cured preform and ceramic material.

The precursor may be a silanol (hydroxy) terminated vinyl substituted dimethyl siloxane, which formula is shown below.

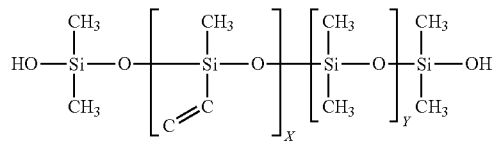

This precursor may have a molecular weight (mw) from about 400 mw to about 10,000 mw, and may preferably have a molecular weight from about 600 mw to 1,000 mw, and may have a viscosity preferably from about 30 cps to about 400 cps. The percentage of methylvinylsiloxane units "X" may be from 1% to 100%. The percentage of the dimethylsiloxane units "Y" may be from 0% to 99%. This precursor may be used, among other things, in a dual-cure system; in this manner the dual-cure can allow the use of multiple cure mechanisms in a single formulation. For example, both condensation type cure and addition type cure can be utilized. This, in turn, provides the ability to have complex cure profiles, which for example may provide for an initial cure via one type of curing and a final cure via a separate type of curing.

The precursor may be a hydrogen (hydride) terminated polydimethyl siloxane, which formula is shown below.

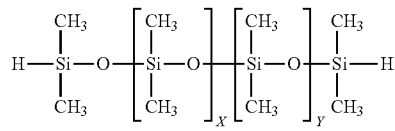

This precursor may have a molecular weight (mw) from about 200 mw to about 10,000 mw, and may preferably have a molecular weight from about 500 mw to 1,500 mw, and may have a viscosity preferably from about 20 cps to about 400 cps. The repeating units are the same. This precursor may be used to provide a polymeric chain extender, as a toughening agent, and it allows lower temperature curing, e.g., room temperature, as well as other features and characteristics to the cured preform and ceramic material.

The precursor may be a di-phenyl terminated siloxane (which may also be referred to as phenyl terminated), which formula is shown below.

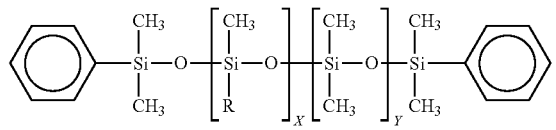

Where here R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl —R— siloxane units "X" may be from 1% to 100%. The percentage of the dimethylsiloxane units "Y" may be from 0% to 99%. This precursor may be used to provide a toughening agent, and to adjust the refractive index of the polymer to match the refractive index of various types of glass, to provide for example transparent fiberglass, as well as, other features and characteristics to the cured preform and ceramic material.

The precursor may be a mono-phenyl terminated siloxane (which may also be referred to as trimethyl terminated, phenyl terminated siloxane), which formulas are shown below.

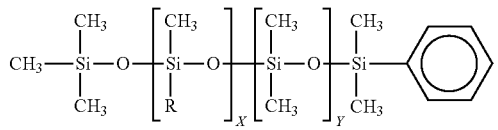

Where R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl —R— siloxane units "X" may be from 1% to 100%. The percentage of the dimethylsiloxane units "Y" may be from 0% to 99%. This precursor may be used to provide a toughening agent and to adjust the refractive index of the polymer to match the refractive index of various types of glass, to provide for example transparent fiberglass, as well as, other features and characteristics to the cured preform and ceramic material.

The precursor may be a diphenyl dimethyl polysiloxane, which formula is shown below.

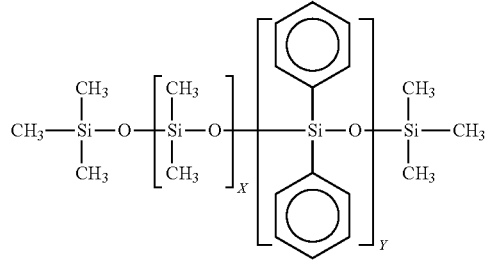

This precursor may have a molecular weight (mw) from about 500 mw to about 20,000 mw, and may have a molecular weight from about 800 to about 4,000, and may have a viscosity preferably from about 100 cps to about 800 cps. The percentage of dimethylsiloxane units "X" may be from 25% to 95%. The percentage of the diphenyl siloxane units "Y" may be from 5% to 75%. This precursor may be used to provide similar characteristics to the mono-phenyl terminated siloxane, as well as, other features and characteristics to the cured preform and ceramic material.

The precursor may be a vinyl terminated diphenyl dimethyl polysiloxane, which formula is shown below.

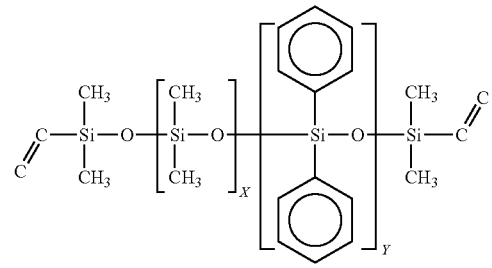

This precursor may have a molecular weight (mw) from about 400 mw to about 20,000 mw, and may have a molecular weight from about 800 to about 2,000, and may have a viscosity preferably from about 80 cps to about 600 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

The precursor may be a hydroxy terminated diphenyl dimethyl polysiloxane, which formula is shown below.

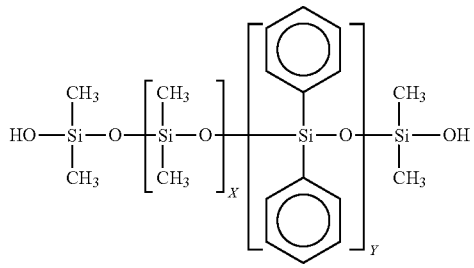

This precursor may have a molecular weight (mw) from about 400 mw to about 20,000 mw, and may have a molecular weight from about 800 to about 2,000, and may have a viscosity preferably from about 80 cps to about 400 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, can generate nano- and micro-scale porosity, as well as other features and characteristics to the cured preform and ceramic material.

This precursor may be a methyl terminated phenylethyl polysiloxane, (which may also be referred to as styrene vinyl benzene dimethyl polysiloxane), which formula is shown below.

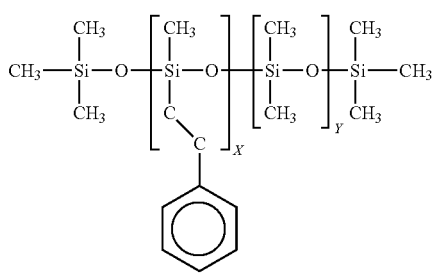

This precursor may have a molecular weight (mw) may be from about 800 mw to at least about 10,000 mw to at least about 20,000 mw, and may have a viscosity preferably from about 50 cps to about 350 cps. The percentage of styrene vinyl benzene siloxane units "X" may be from 1% to 60%. The percentage of the dimethylsiloxane units "Y" may be from 40% to 99%. This precursor may be used to provide improved toughness, decreases reaction cure exotherm, may change or alter the refractive index, adjust the refractive index of the polymer to match the refractive index of various types of glass, to provide for example transparent fiberglass, as well as, other features and characteristics to the cured preform and ceramic material.

The forgoing linear siloxane backbone materials, are by way of example, and it is understood that other similar linear siloxane backbone materials can also be used as precursors. More complex linear and branched siloxane backbone materials may be used as precursors, but are not preferred.

A variety of cyclosiloxanes can be used as precursors, and are reactive molecules, in the formulation. They can be described by the following nomenclature system or formula: $D_xD^*_y$, where "D" represents a dimethyl siloxy unit and "D*" represents a substituted methyl siloxy unit, where the "*" group could be vinyl, allyl, hydride, hydroxy, phenyl, styryl, alkyl, cyclopentadienyl, or other organic group, x is from 0-8, y is >=1, and x+y is from 3-8. Further, in this nomenclature system—D represents —$SiO_2$ groups, typically $Me_2SiO_2$, Q represents $SiO_4$, T represents —$SiO_3$ groups, typically $MeSiO_3$ and M represent —SiO groups, typically $Me_3SiO$.

The precursor batch may also: (i) contain non-silicon based precursors, such as non-silicon based cross-linking agents; (ii) be the reaction product of a non-silicon based cross linking agent and a silicon based precursor; and, (iii) combinations and variation of these. The non-silicon based cross-linking agents are intended to, and provide, the capability to cross-link during curing. For example, non-silicon based cross-linking agents include: cyclopentadiene (CP), methylcyclopentadiene (MeCP), dicyclopentadiene (DCPD), methyldicyclopentadiene (MeDCPD), tricyclopentadiene (TCPD), piperylene, divnylbenzene, isoprene, norbomadiene, vinylnorbomene, propenylnorbomene, isopropenylnorbornene, methylvinylnorbomene, bicyclononadiene, methylbicyclononadiene, propadiene, 4-vinylcyclohexene, 1,3-heptadiene, cycloheptadiene, 1,3-butadiene, cyclooctadiene and isomers thereof. Generally, any hydrocarbon that contains two (or more) unsaturated, C=C, bonds that can react with a Si—H, or other Si bond in a precursor, can be used as a cross-linking agent. Some organic materials containing oxygen, nitrogen, and sulphur may also function as cross-linking agents.

The amount of the non-silicon based cross-linking agent to the silicon based precursor can be from about 10% to 90% non-silicon based cross-linker to 10% to 90% silicon based precursor (preferably a silicon backbone, e.g., —Si—O— backbone, material). Thus, the ranges of amounts can be, for example: DCPD/MHF from 10/90 to 90/10, about 40/60 to 60/40, about 50/50, and combinations and variations of these ratios, as well as other ratios. A third and fourth precursor material may also be used. Thus, the ratio of non-silicon cross linker/silicon backbone precursor/third precursor, can be: form about 10% to about 80% non-silicon based cross linker; from about 10% to 80% silicon based precursor: and form about 0.1% to 40% third precursor. The ranges and amounts can be, for example: DCPD/MHF/$3^{rd}$ precursor from about 10/20/70 to 70/20/10, from about 10/20/70 to 10/70/20, from about 45/55/10 to about 55/45/10, from about 40/55/5 to about 55/40/5 and combinations and variations of these ratios as well as other ratios.

The precursor may be a reactive monomer. These would include molecules, such as tetramethyltetravinylcyclotetrasiloxane (TV), which formula is shown below.

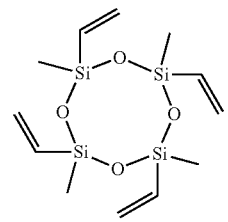 [SMILES: C=C[Si]1(C)O[Si](C)(C=C)O[Si](C)(C=C)O[Si](C)(C=C)O1]

This precursor may be used to provide a branching agent, a three-dimensional cross-linking agent, as well as, other features and characteristics to the cured preform and ceramic material. (It is also noted that in certain formulations, e.g., above 2%, and certain temperatures, e.g., about from about room temperature to about 60° C., this precursor may act as an inhibitor to cross-linking, e.g., in may inhibit the cross-linking of hydride and vinyl groups.)

The precursor may be a reactive monomer, for example, such as trivinyl cyclotetrasiloxane,

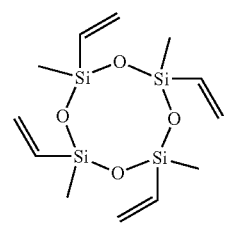 [SMILES: C=C[Si]1(C)O[Si](C)(C=C)O[Si](C)(C=C)O[Si](C)(C=C)O1]

divinyl cyclotetrasiloxane,

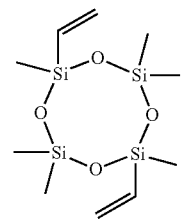

trivinyl monohydride cyclotetrasiloxane,

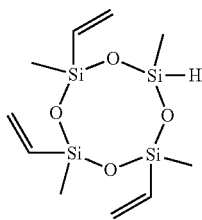 [SMILES: C=C[Si]1(C)O[SiH](C)O[Si](C)(C=C)O[Si](C)(C=C)O1]

divinyl dihydride cyclotetrasiloxane,

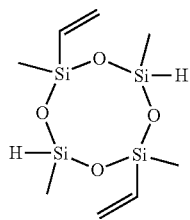 [SMILES: C=C[Si]1(C)O[SiH](C)O[Si](C)(C=C)O[SiH](C)O1]

and a hexamethyl cyclotetrasiloxane, such as,

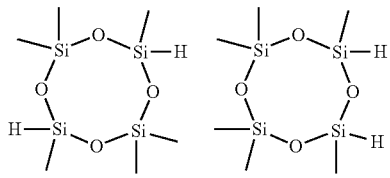

The precursor may be a silane modifier, such as vinyl phenyl methylsilane, diphenylsilane, diphenylmethylsilane, and phenylmethylsilane (some of which may be used as an end capper or end termination group). These silane modifiers can provide chain extenders and branching agents. They also improve toughness, alter refractive index, and improve high temperature cure stability of the cured material, as well as improving the strength of the cured material, among other things. A precursor, such as diphenylmethylsilane, may function as an end capping agent, that may also improve toughness, alter refractive index, and improve high temperature cure stability of the cured material, as well as, improving the strength of the cured material, among other things.

The precursor may be a reaction product of a silane modifier with a vinyl terminated siloxane backbone additive. The precursor may be a reaction product of a silane modifier with a hydroxy terminated siloxane backbone additive. The precursor may be a reaction product of a silane modifier with a hydride terminated siloxane backbone additive. The precursor may be a reaction product of a silane modifier with TV. The precursor may be a reaction product of a silane. The precursor may be a reaction product of a silane modifier with a cyclosiloxane, taking into consideration steric hindrances. The precursor may be a partially hydrolyzed tertraethyl orthosilicate, such as TES 40 or Silbond 40. The precursor may also be a methylsesquisiloxane such as SR-350 available from Momentive (previously from General Electric Company, Wilton, Conn.). The precursor may also be a phenyl methyl siloxane such as 604 from Wacker Chemie AG. The precursor may also be a methylphenylvinylsiloxane, such as H62 C from Wacker Chemie AG.

The precursors may also be selected from the following: SiSiB® HF2020, TRIMETHYLSILYL TERMINATED METHYL HYDROGEN SILICONE FLUID 63148-57-2; SiSiB® HF2050 TRIMETHYLSILYL TERMINATED METHYLHYDROSILOXANE DIMETHYLSILOXANE COPOLYMER 68037-59-2; SiSiB® HF2060 HYDRIDE TERMINATED METHYLHYDROSILOXANE DIMETHYLSILOXANE COPOLYMER 69013-23-6; SiSiB® HF2038 HYDROGEN TERMINATED POLYDIPHENYL SILOXANE; SiSiB® HF2068 HYDRIDE TERMINATED METHYLHYDROSILOXANE DIMETHYLSILOXANE COPOLYMER 115487-49-5; SiSiB® HF2078 HYDRIDE TERMINATED POLY(PHENYLDIMETHYLSILOXY) SILOXANE PHENYL SILSESQUIOXANE, HYDROGEN-TERMINATED 68952-30-7; SiSiB® VF6060 VINYLDIMETHYL TERMINATED VINYLMETHYL DIMETHYL POLYSILOXANE COPOLYMERS 68083-18-1; SiSiB® VF6862 VINYLDIMETHYL TERMINATED DIMETHYL DIPHENYL POLYSILOXANE COPOLYMER 68951-96-2; SiSiB® VF6872 VINYLDIMETHYL TERMINATED DIMETHYL-METHYLVINYL-DIPHENYL POLYSILOXANE COPOLYMER; SiSiB® PC9401 1,1,3,3-TETRAMETHYL-1,3-DIVINYLDISILOXANE 2627-95-4; SiSiB® PF1070 SILANOL TERMINATED POLYDIMETHYLSILOXANE (OF1070) 70131-67-8; SiSiB® OF1070 SILANOL TERMINATED POLYDIMETHYSILOXANE 70131-67-8; OH-ENDCAPPED POLYDIMETHYLSILOXANE HYDROXY TERMINATED OLYDIMETHYLSILOXANE 73138-87-1; SiSiB® VF6030 VINYL TERMINATED POLYDIMETHYL SILOXANE 68083-19-2; and, SiSiB® HF2030 HYDROGEN TERMINATED POLYDIMETHYLSILOXANE FLUID 70900-21-9.

Thus, in additional to the forgoing type of precursors, it is contemplated that a precursor may be a compound of the following general formula.

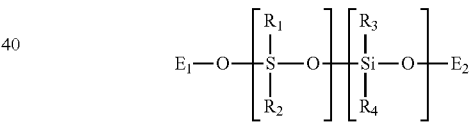

Wherein end cappers $E_1$ and $E_2$ are chosen from groups such as trimethylsiliy (trimethyl silicon) (—Si(CH$_3$)$_3$), dimethylsilyl hydroxy (dimethyl silicon hydroxy) (—Si(CH$_3$)$_2$OH), dimethylhydridosilyl (dimethyl silicon hydride) (—Si(CH$_3$)$_2$H), dimethylvinylsilyl (dimethyl vinyl silicon) (—Si(CH$_3$)$_2$(CH=CH$_2$)), dimethylphenylsily (—Si(CH$_3$)$_2$(C$_6$H$_5$)) and dimethylalkoxysilyl (dimethyl alkoxy silicon) (—Si(CH$_3$)$_2$(OR). The R groups $R_1$, $R_2$, $R_3$, and $R_4$ may all be different, or one or more may be the same. Thus, for example, $R_2$ is the same as $R_3$, $R_3$ is the same as $R_4$, $R_1$ and $R_2$ are different with $R_3$ and $R_4$ being the same, etc. The R groups are chosen from groups such as hydride (—H), methyl (Me)(-C), ethyl (—C—C), vinyl (—C=C), alkyl (—R)(C$_n$H$_{2n+1}$), allyl (—C—C=C), aryl ('R), phenyl (Ph) (-C$_6$H$_5$), methoxy (—O—C), ethoxy (—O—C—C), siloxy (—O—Si—R$_3$), alkoxy (—O—R), hydroxy (—O—H), phenylethyl (—C—C—C$_6$H$_5$) and methyl,phenyl-ethyl (—C—C(—C)(—C$_6$H$_5$).

In general, embodiments of formulations for polysilocarb formulations may, for example, have from about 0% to 50% MHF, about 20% to about 99% MHF, about 0% to about 30% siloxane backbone material, about 20% to about 99% siloxane backbone materials, about 0% to about 70% reactive monomers, about 0% to about 95% TV, about 0% to about 70% non-silicon based cross linker, and, about 0% to about 90% reaction products of a siloxane backbone additives with a silane modifier or an organic modifier reaction product.

In mixing the formulations sufficient time should be used to permit the precursors to become effectively mixed and dispersed. Generally, mixing of about 15 minutes to an hour is sufficient. Typically, the precursor formulations are relatively, and essentially, shear insensitive, and thus the type of pumps or mixing are not critical. It is further noted that in higher viscosity formulations additional mixing time may be required. The temperature of the formulations, during mixing should preferably be kept below about 45° C., and preferably about 10° C. (It is noted that these mixing conditions are for the pre-catalyzed formulations.)

The Reaction Type Process

In the reaction type process, in general, a chemical reaction is used to combine one, two or more precursors, typically in the presence of a solvent, to form a precursor formulation that is essentially made up of a single polymer that can then be, catalyzed, cured and pyrolized. This process provides the ability to build custom precursor formulations that when cured can provide plastics having unique and desirable features. The cured materials can also be pyrolized to form ceramics having unique features. The reaction type process allows for the predetermined balancing of different types of functionality in the end product by selecting functional groups for incorporation into the polymer that makes up the precursor formulation, e.g., phenyls which typically are not used for ceramics but have benefits for providing high temperature capabilities for plastics, and styrene which typically does not provide high temperature features for plastics but provides benefits for ceramics.

In general a custom polymer for use as a precursor formulation is made by reacting precursors in a condensation reaction to form the polymer precursor formulation. This precursor formulation is then cured into a preform, i.e., plastic, cured solid or semi-solid material, through a hydrolysis reaction. The condensation reaction forms a polymer of the type shown below.

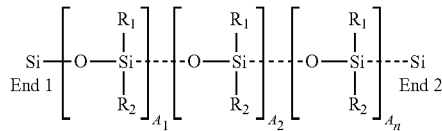

Where $R_1$ and $R_2$ in the polymeric units can be a hydride (—H), a methyl (Me)(-C), an ethyl (—C—C), a vinyl (—C=C), an alkyl (—R)($C_nH_{2n+1}$), an unsaturated alkyl (—$C_nH_{2n-1}$), a cyclic alkyl (—$C_nH_{2n-1}$), an allyl (—C—C=C), a butenyl (—$C_4H_7$), a pentenyl (—$C_5H_9$), a cyclopentenyl (—$C_5H_7$), a methyl cyclopentenyl (—$C_5H_6(CH_3)$), a norbornenyl (—$C_XH_Y$, where X=7-15 and Y=9-18), an aryl ('R), a phenyl (Ph)(-$C_6H_5$), a cycloheptenyl (—$C_7H_{11}$), a cyclooctenyl (—$C_8H_{13}$), an ethoxy (—O—C—C), a siloxy (—O—Si—$R_3$), a methoxy (—O—C), an alkoxy, (—O—R), a hydroxy, (—O—H), a phenylethyl (—C—C—$C_6H_5$) a methyl,phenyl-ethyl (—C—C(—C)(—$C_6H_5$)) and a vinyl-phenyl-ethyl (—C—C($C_6H_4$(—C=C))). $R_1$ and $R_2$ may be the same or different. The custom precursor polymers can have several different polymeric units, e.g., $A_1$, $A_2$, $A_n$, and may include as many as 10, 20 or more units, or it may contain only a single unit, for example, MHF made by the reaction process may have only a single unit.

Embodiments may include precursors, which include among others, a triethoxy methyl silane, a diethoxy methyl phenyl silane, a diethoxy methyl hydride silane, a diethoxy methyl vinyl silane, a dimethyl ethoxy vinyl silane, a diethoxy dimethyl silane, an ethoxy dimethyl phenyl silane, a diethoxy dihydride silane, a triethoxy phenyl silane, a diethoxy hydride trimethyl siloxane, a diethoxy methyl trimethyl siloxane, a trimethyl ethoxy silane, a diphenyl diethoxy silane, a dimethyl ethoxy hydride siloxane, and combinations and variations of these and other precursors, including other precursors set forth in this specification.

The end units, Si End 1 and Si End 2, can come from the precursors of dimethyl ethoxy vinyl silane, ethoxy dimethyl phenyl silane, and trimethyl ethoxy silane. Additionally, if the polymerization process is properly controlled a hydroxy end cap can be obtained from the precursors used to provide the repeating units of the polymer.

In general, the precursors are added to a vessel with ethanol (or other material to absorb heat, e.g., to provide thermal mass), an excess of water, and hydrochloric acid (or other proton source). This mixture is heated until it reaches its activation energy, after which the reaction typically is exothermic. Generally, in this reaction the water reacts with an ethoxy group of the silane of the precursor monomer, forming a hydroxy (with ethanol as the byproduct). Once formed this hydroxy becomes subject to reaction with an ethoxy group on the silicon of another precursor monomer, resulting in a polymerization reaction. This polymerization reaction is continued until the desired chain length(s) is built.

Control factors for determining chain length, among others, are: the monomers chosen (generally, the smaller the monomers the more that can be added before they begin to coil around and bond to themselves); the amount and point in the reaction where end cappers are introduced; and the amount of water and the rate of addition, among others. Thus, the chain lengths can be from about 180 mw (viscosity about 5 cps) to about 65,000 mw (viscosity of about 10,000 cps), greater than about 1000 mw, greater than about 10,000 mw, greater than about 50,000 mw and greater. Further, the polymerized precursor formulation may, and typically does, have polymers of different molecular weights, which can be predetermined to provide formulation, cured, and ceramic product performance features.

Upon completion of the polymerization reaction the material is transferred into a separation apparatus, e.g., a separation funnel, which has an amount of deionized water that, for example, is from about 1.2× to about 1.5× the mass of the material. This mixture is vigorously stirred for about less than 1 minute and preferably from about 5 to 30 seconds. Once stirred the material is allowed to settle and separate, which may take from about 1 to 2 hours. The polymer is the higher density material and is removed from the vessel. This removed polymer is then dried by either warming in a shallow tray at 90° C. for about two hours; or, preferably, is passed through a wiped film distillation apparatus, to remove any residual water and ethanol. Alternatively, sodium bicarbonate sufficient to buffer the aqueous layer to a pH of about 4 to about 7 is added. It is further understood that other, and commercial, manners of mixing, reacting and separating the polymer from the material may be employed.

Preferably a catalyst is used in the curing process of the polymer precursor formulations from the reaction type process. The same polymers, as used for curing the precursor formulations from the mixing type process can be used. It is noted that, generally unlike the mixing type formulations, a catalyst is not necessarily required to cure a reaction type polymer. Inhibitors may also be used. However, if a catalyst is not used, reaction time and rates will be slower. The curing and the pyrolysis of the cured material from the reaction process is essentially the same as the curing and pyrolysis of the cured material from the mixing process and the reaction blending process.

The reaction type process can be conducted under numerous types of atmospheres and conditions, e.g., air, inert, $N_2$, Argon, flowing gas, static gas, reduced pressure, ambient pressure, elevated pressure, and combinations and variations of these.

The Reaction Blending Type Process

In the reaction blending type process precursor are reacted to from a precursor formulation, in the absence of a solvent. For example, an embodiment of a reaction blending type process has a precursor formulation that is prepared from MHF and Dicyclopentadiene (DCPD). Using the reactive blending process a MHF/DCPD polymer is created and this polymer is used as a precursor formulation. It can be used alone to form a cured or pyrolized product, or as a precursor in the mixing or reaction processes.

Thus, for example, from about 40 to 90% MHF of known molecular weight and hydride equivalent mass; about 0.20 wt % P01 catalyst; and from about 10 to 60% DCPD with >83% purity, can be used.

P01 is a 2% Pt(0) tetravinylcyclotetrasiloxane complex in tetravinylcyclotetrasiloxane, diluted 20× with tetravinylcyclotetrasiloxane to 0.1% of Pt(0) complex. In this manner 10 ppm Pt is provided for every 1% loading of bulk cat.

In an embodiment of the process, a sealable reaction vessel, with a mixer, can be used for the reaction. The reaction is conducted in the sealed vessel, in air; although other types of atmosphere can be utilized. Preferably, the reaction is conducted at atmospheric pressure, but higher and lower pressures can be utilized. Additionally, the reaction blending type process can be conducted under numerous types of atmospheres and conditions, e.g., air, inert, $N_2$, Argon, flowing gas, static gas, reduced pressure, ambient pressure, elevated pressure, and combinations and variations of these.

In an embodiment, 850 grams of MHF (85% of total polymer mixture) is added to reaction vessel and heated to about 50° C. Once this temperature is reached the heater is turned off, and 0.20% (by weight of the MHF) of P01 Platinum catalyst is added to the MHF in the reaction vessel. Typically, upon addition of the catalyst, bubbles will form and temperature will initially rise approximately 2-20° C.

When the temperature begins to fall, about 150 g of DCPD (15 wt % of total polymer mixture) is added to the reaction vessel. The temperature may drop an additional amount, e.g., around 5-7° C.

At this point in the reaction process the temperature of the reaction vessel is controlled to, maintain a predetermined temperature profile over time, and to manage the temperature increase that may be accompanied by an exotherm. Preferably, the temperature of the reaction vessel is regulated, monitored and controlled throughout the process.

In an embodiment of the MHF/DCPD embodiment of the reaction process, the temperature profile can be as follows: let temperature reach about 80° C. (may take ~15-40 min, depending upon the amount of materials present); temperature will then increase and peak at ~104° C., as soon as temperature begins to drop, the heater set temperature is increased to 100° C. and the temperature of the reaction mixture is monitored to ensure the polymer temperature stays above 80° C. for a minimum total of about 2 hours and a maximum total of about 4 hours. After 2-4 hours above 80° C., the heater is turn off, and the polymer is cooled to ambient. It being understood that in larger and smaller batches, continuous, semi-continuous, and other type processes the temperature and time profile may be different.

In larger scale, and commercial operations, batch, continuous, and combinations of these, may be used. Industrial factory automation and control systems can be utilized to control the reaction, temperature profiles and other processes during the reaction.

Table A sets forth various embodiments of precursor materials.

TABLE A

| Material Name | degree of polymerization | Equivalents Si/mole | Equivalents O/mole | Equivalents H/mol | Equivalents Vi/mol | Equivalents methyl/mole | Equivalents C/mole | MW | grams/mole of vinyl |
|---|---|---|---|---|---|---|---|---|---|
| tetramethylcyclotetrasiloxane ($D_4$) | 4 | 4 | 4 | 4 | 0 | 4 | 4 | 240.51 | |
| MHF | 33 | 35 | 34 | 33 | 0 | 39 | 39 | 2145.345 | |
| VMF | 5 | 7 | 6 | 0 | 5 | 11 | 21 | 592.959 | 118.59 |
| TV | 4 | 4 | 4 | 0 | 4 | 4 | 12 | 344.52 | 86.13 |
| VT 0200 | 125 | 127 | 126 | 0 | 2 | 254 | 258 | 9451.206 | 4725.60 |
| VT 0020 | 24 | 26 | 25 | 0 | 2 | 52 | 56 | 1965.187 | 982.59 |
| VT 0080 | 79 | 81 | 80 | 0 | 2 | 162 | 166 | 6041.732 | 3020.84 |
| Styrene | | | | | 2 | | | 104.15 | 52.08 |
| Dicyclopentadiene | | | | | 2 | | | 132.2 | 66.10 |
| 1,4-divinylbenzene | | | | | 2 | | | 130.19 | 65.10 |
| isoprene | | | | | 2 | | | 62.12 | 31.06 |
| 1,3 Butadiene | | | | | 2 | | | 54.09 | 27.05 |
| Catalyst 10 ppm Pt | | | | | | | | | |
| Catalyst LP 231 | | | | | | | | | |

In the above table, the "degree of polymerization" is the number of monomer units, or repeat units, that are attached together to from the polymer. "Equivalents_/mol" refers to the molar equivalents. "Grams/mole of vinyl" refers to the amount of a given polymer needed to provide 1 molar equivalent of vinyl functionality. "VMH" refers to methyl vinyl fluid, a linear vinyl material from the ethoxy process, which can be a substitute for TV. The numbers "0200" etc. for VT are the viscosity (e.g., 0200=200 cps) in centipoise for that particular VT.

Curing and Pyrolysis

Precursor formulations, including the polysilocarb precursor formulations from the above types of processes, as well as others, can be cured to form a solid, semi-sold, or plastic like material. Typically, the precursor formulations are spread, shaped, or otherwise formed into a preform, which would include any volumetric structure, or shape, including thin and thick films. In curing, the polysilocarb precursor formulation may be processed through an initial cure, to provide a partially cured material, which may also be referred to, for example, as a preform, green material, or green cure (not implying anything about the material's color). The green material may then be further cured. Thus, one or more curing steps may be used. The material may be "end cured," i.e., being cured to that point at which the material has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, i.e., all of the reaction has stopped, or the leveling off of the decrease in reactive groups over time, i.e., essentially all of the reaction has stopped). Thus, the material may be cured to varying degrees, depending upon its intended use and purpose. For example, in some situations the end cure and the hard cure may be the same. Curing conditions such as atmosphere and temperature may affect the composition of the cured material.

In multi-layer, or composite structures and shapes, a layer of the polysilocarb material may be cured to varying of degrees, for example in a multi-layer embodiment, the layers can be green cured to promote layer adhesion, then finally cured to a hard cure. Each layer in a multi-layer structure can be cured to the same degree of cure, to different degrees of cure, subject to one, two, three or more curing steps, and combinations and variations of these.

The curing may be done at standard ambient temperature and pressure ("SATP", 1 atmosphere, 25° C.), at temperatures above or below that temperature, at pressures above or below that pressure, and over varying time periods. The curing can be conducted over various heatings, rate of heating, and temperature profiles (e.g., hold times and temperatures, continuous temperature change, cycled temperature change, e.g., heating followed by maintaining, cooling, reheating, etc.). The time for the curing can be from a few seconds (e.g., less than about 1 second, less than 5 seconds), to less than a minute, to minutes, to hours, to days (or potentially longer). The curing may also be conducted in any type of surrounding environment, including for example, gas, liquid, air, water, surfactant containing liquid, inert atmospheres, $N_2$, Argon, flowing gas (e.g., sweep gas), static gas, reduced $O_2$ (e.g., an amount of $O_2$ lower than atmospheric, such as less than 20% $O_2$, less than 15% $O_2$, less than 10% $O_2$ less than 5% $O_2$), reduced pressure (e.g., less than atmospheric), elevated pressure (e.g., greater than atmospheric), enriched $O_2$, (e.g., an amount of $O_2$ greater than atmospheric), ambient pressure, controlled partial pressure and combinations and variations of these and other processing conditions.

In an embodiment, the curing environment, e.g., the furnace, the atmosphere, the container and combinations and variations of these can have materials that contribute to or effect, for example, the composition, catalysis, stoichiometry, features, performance and combinations and variations of these in the preform, the cured material, the ceramic and the final applications or products.

For high purity materials, the furnace, containers, handling equipment, atmosphere, and other components of the curing apparatus and process are clean, essentially free from, and do not contribute any elements or materials, that would be considered impurities or contaminants, to the cured material.

Preferably, in embodiments of the curing process, the curing takes place at temperatures in the range of from about 5° C. or more, from about 20° C. to about 250° C., from about 20° C. to about 150° C., from about 75° C. to about 125° C., and from about 80° C. to 90° C. Although higher and lower temperatures and various heating profiles, (e.g., rate of temperature change over time ("ramp rate", e.g., Δ degrees/time), hold times, and temperatures) can be utilized.

The cure conditions, e.g., temperature, time, ramp rate, may be dependent upon, and in some embodiments can be predetermined, in whole or in part, by the formulation to match, for example the size of the preform, the shape of the preform, or the mold holding the preform to prevent stress cracking, off gassing, or other phenomena associated with the curing process. Further, the curing conditions may be such as to take advantage of, preferably in a controlled manner, what may have previously been perceived as problems associated with the curing process. Thus, for example, off gassing may be used to create a foam material having either open or closed structure. Similarly, curing conditions can be used to create or control the microstructure and the nanostructure of the material. In general, the curing conditions can be used to affect, control or modify the kinetics and thermodynamics of the process, which can affect morphology, performance, features and functions, among other things.

Upon curing the polysilocarb precursor formulation a cross linking reaction takes place that provides in some embodiments a cross-linked structure having, among other things, by way of example, an —$R_1$—Si—C—C—Si—O—Si—C—C—Si—$R_2$— where $R_1$ and $R_2$ vary depending upon, and are based upon, the precursors used in the formulation. In an embodiment of the cured materials they may have a cross-linked structure having 3-coordinated silicon centers to another silicon atom, being separated by fewer than 5 atoms between silicon atoms. Although additional other structures and types of cured materials are contemplated. Thus, for example, use of Luperox 231 could yield a structure, from the same monomers, that was —Si—C—C—C—Si—. When other cross linking agents are used, e.g, DCPD and divinyl benzene, the number of carbons atoms between the silicon atoms will be greater than 5 atoms. A generalized formula for some embodiments of the cross-linked, e.g., cured, material, would be —Si—$R_3$—Si—, where $R_3$ would be ethyl (from for example a vinyl precursor), propyl (from for example a allyl precursor), dicyclopentane (from for example a DCPD precursor), norbornane (from for example a norbomadiene precursor), diethylbenzene (from for example a divinyl benzene precursor), and others.

During the curing process, some formulations may exhibit an exotherm, i.e., a self heating reaction, that can produce a small amount of heat to assist or drive the curing reaction, or that may produce a large amount of heat that may need to be managed and removed in order to avoid problems, such as stress fractures. During the cure off gassing typically occurs and results in a loss of material, which loss is defined generally by the amount of material remaining, e.g., cure yield. Embodiments of the formulations, cure conditions, and polysilocarb precursor formulations of embodiments of the present inventions can have cure yields of at least about 90%, about 92%, about 100%. In fact, with air cures the materials may have cure yields above 100%, e.g., about 101-105%, as a result of oxygen being absorbed from the air. Additionally, during curing the material typically shrinks, this shrinkage may be, depending upon the formulation, cure conditions, and the nature of the preform shape, and whether the preform is reinforced, filled, neat or unreinforced, from about 20%, less than 20%, less than about 15%, less than about 5%, less than about 1%, less than about 0.5%, less than about 0.25% and smaller.

Curing may be accomplished by any type of heating apparatus, or mechanisms, techniques, or morphologies that has the requisite level of temperature and environmental control. Curing may be accomplished through, for example, heated water baths, electric furnaces, microwaves, gas furnaces, furnaces, forced heated air, towers, spray drying, falling film reactors, fluidized bed reactors, indirect heating elements, direct heating (e.g., heated surfaces, drums, and plates), infrared heating, UV irradiation (light), an RF furnace, in-situ during emulsification via high shear mixing, in-situ during emulsification via ultrasonication, broad spectrum white light, IR light, coherent electromagnetic radiation (e.g. lasers, including visible, UV and IR), and convection heating, to name a few.

In an embodiment, curing may also occur under ambient conditions for an embodiment having a sufficient amount of catalyst.

If pyrolysis is conducted for an embodiment the cured material can be for example heated to about 600° C. to about 2,300° C.; from about 650° C. to about 1,200° C., from about 800° C. to about 1300° C., from about 900° C. to about 1,200° C. and from about 950° C. to 1,150° C. At these temperatures typically all organic structures are either removed or combined with the inorganic constituents to form a ceramic. Typically, at temperatures in the about 650° C. to 1,200° C. range the resulting material is an amorphous glassy ceramic. When heated above about 1,200° C. the material typically may from nano crystalline structures, or micro crystalline structures, such as SiC, Si3N$_4$, SiCN, β SiC, and above 1,900° C. an α SiC structure may form, and at and above 2,200° C. α SiC is typically formed. The pyrolized, e.g., ceramic materials can be single crystal, polycrystalline, amorphous, and combinations, variations and subgroups of these and other types of morphologies.

The pyrolysis may be conducted under may different heating and environmental conditions, which preferably include thermo control, kinetic control and combinations and variations of these, among other things. For example, the pyrolysis may have various heating ramp rates, heating cycles and environmental conditions. In some embodiments, the temperature may be raised, and held a predetermined temperature, to assist with known transitions (e.g., gassing, volatilization, molecular rearrangements, etc.) and then elevated to the next hold temperature corresponding to the next known transition. The pyrolysis may take place in reducing atmospheres, oxidative atmospheres, low O$_2$, gas rich (e.g., within or directly adjacent to a flame), inert, N$_2$, Argon, air, reduced pressure, ambient pressure, elevated pressure, flowing gas (e.g., sweep gas, having a flow rate for example of from about from about 15.0 GHSV (gas hourly space velocity) to about 0.1 GHSV, from about 6.3 GHSV to about 3.1 GHSV, and at about 3.9 GHSV), static gas, and combinations and variations of these.

In some embodiments, upon pyrolization, graphenic, graphitic, amorphous carbon structures and combinations and variations of these are present in the Si—O—C ceramic. A distribution of silicon species, consisting of SiOxCy structures, which result in SiO$_4$, SiO$_3$C, SiO$_2$C$_2$, SiOC$_3$, and SiC$_4$ are formed in varying ratios, arising from the precursor choice and their processing history. Carbon is generally bound between neighboring carbons and/or to a Silicon atom. In general, in the ceramic state, carbon is largely not coordinated to an oxygen atom, thus oxygen is largely coordinated to silicon The pyrolysis may be conducted in any heating apparatus, that maintains the request temperature and environmental controls. Thus, for example pyrolysis may be done with, pressure furnaces, box furnaces, tube furnaces, crystal-growth furnaces, graphite box furnaces, arc melt furnaces, induction furnaces, kilns, MoSi$_2$ heating element furnaces, carbon furnaces, vacuum furnaces, gas fired furnaces, electric furnaces, direct heating, indirect heating, fluidized beds, RF furnaces, kilns, tunnel kilns, box kilns, shuttle kilns, coking type apparatus, lasers, microwaves, other electromagnetic radiation, and combinations and variations of these and other heating apparatus and systems that can obtain the request temperatures for pyrolysis.

In embodiments of the polysilocarb derived ceramic materials has any of the amounts of Si, O, C for the total amount of material that are set forth in the Table B.

TABLE B

|  | Si | | O | | C | |
| --- | --- | --- | --- | --- | --- | --- |
|  | Lo | Hi | Lo | Hi | Lo | Hi |
| Wt % | 35.00% | 50.00% | 10.00% | 35.00% | 5.00% | 30.00% |
| Mole Ratio | 1.000 | 1.429 | 0.502 | 1.755 | 0.334 | 2.004 |
| Mole % | 15.358% | 63.095% | 8.821% | 56.819% | 6.339% | 57.170% |

In general, embodiments of the pyrolized ceramic polysilocarb materials can have about 20% to about 65% Si, can have about 5% to about 50% O, and can have about 3% to about 55% carbon weight percent. Greater and lesser amounts are also contemplated.

In general, embodiment of the pyrolized ceramic polysilocarb materials can have a mole ratio (based on total Si, O, and C) of about 0.5 to about 2.5 for Si, can have a mole ratio of about 0.2 to about 2.5 for O, and can have a mole ration of about 0.1 to about 4.5 for C. Greater and lesser amounts are also contemplated.

In general, embodiment of the pyrolized ceramic polysilocarb materials can have a mole % (percentage of total Si, O, and C) of about 13% to about 68% for Si, can have a mole % of about 6% to about 60% for O, and can have a mole % of about 4% to about 75% for C. Greater and lesser amounts are also contemplated.

The type of carbon present in embodiments of the polysilocarb derived ceramic pigments can be free carbon, (e.g., turbostratic, amorphous, graphenic, graphitic forms of carbon) and carbon that is bound to silicon. Embodiments of ceramic polysilocarb materials having free carbon and silicon-bound-carbon (Si—C) are set forth in Table C. Greater and lesser amounts and different percentages of free carbon and silicon-bound-carbon are also contemplated.

TABLE C

| Embodiment | % Free Carbon | % Si—C type |
| --- | --- | --- |
| 1 | 64.86 | 35.14 |
| 2 | 63.16 | 36.85 |
| 3 | 67.02 | 32.98 |
| 4 | 58.59 | 41.41 |
| 5 | 68.34 | 31.66 |
| 6 | 69.18 | 30.82 |
| 7 | 65.66 | 34.44 |
| 8 | 72.74 | 27.26 |
| 9 | 72.46 | 27.54 |
| 10 | 78.56 | 21.44 |

Generally, embodiments of polysilocarb derived ceramic materials can have from about 30% free carbon to about 70% free carbon, from about 20% free carbon to about 80% free carbon, and from about 10% free carbon to about 90% free carbon, and from about 30% Si—C bonded carbon to about 70% Si—C bonded carbon, from about 20% Si—C bonded carbon to about 80% Si—C bonded carbon, and from about 10% Si—C bonded carbon to about 90% Si—C bonded carbon. Greater and lesser amounts are also contemplated.

Metals and Metal Complexes

By way of example, metals and metal complexes that can be used as fill material would include Cyclopentadienyl compounds of the transition metals can be utilized. Cyclopentadienyl compounds of the transition metals can be organized into two classes: Bis-cyclopentadienyl complexes; and Monocyclopentadienyl complexes. Cyclopentadienyl complexes can include $C_5H_5$, $C_5Me_5$, $C_5H_4Me$, $CH_5R_5$ (where R=Me, Et, Propyl, i-Propyl, butyl, Isobutyl, Sec-butyl). In either of these cases Si can be directly bonded to the Cyclopentadienyl ligand or the Si center can be attached to an alkyl chain, which in turn is attached to the Cyclopentadienyl ligand.

Cyclopentadienyl complexes, that can be utilized with precursor formulations and in products, can include: bis-cyclopentadienyl metal complexes of first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum); Lanthanide series (La, Ce, Pr, Nd, Pm, Sm, Eu, Gd, Tb, Dy, Ho); and Actinide series (Ac, Th, Pa, U, Np).

Monocyclopentadienyl complexes may also be utilized to provide metal functionality to precursor formulations and would include monocyclopentadienyl complexes of: first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum) when preferably stabilized with proper ligands, (for instance Chloride or Carbonyl).

Alkyl complexes of metals may also be used to provide metal functionality to precursor formulations and products. In these alkyl complexes the Si center has an alkyl group (ethyl, propyl, butyl, vinyl, propenyl, butenyl) which can bond to transition metal direct through a sigma bond. Further, this would be more common with later transition metals such as Pd, Rh, Pt, Ir.

Coordination complexes of metals may also be used to provide metal functionality to precursor formulations and products. In these coordination complexes the Si center has an unsaturated alkyl group (vinyl, propenyl, butenyl, acetylene, butadienyl) which can bond to carbonyl complexes or ene complexes of Cr, Mo, W, Mn, Re, Fe, Ru, Os, Co, Rh, Ir, Ni. The Si center may also be attached to a phenyl, substituted phenyl or other aryl compound (pyridine, pyrimidine) and the phenyl or aryl group can displace carbonyls on the metal centers.

Metal alkoxides may also be used to provide metal functionality to precursor formulations and products. Metal alkoxide compounds can be mixed with the silicon precursor compounds and then treated with hydroxide to form the oxides at the same time as the polymer, copolymerizes. This can also be done with metal halides and metal amides. Preferably, this may be done using early transition metals along with Aluminum, Gallium and Indium, later transition metals: Fe, Mn, Cu, and alkaline earth metals: Ca, Sr, Ba, Mg.

Compounds where Si is directly bonded to a metal center which is stabilized by halide or organic groups may also be utilized to provide metal functionality to precursor formulations and products.

Additionally, it should be understood that the metal and metal complexes may be the continuous phase after pyrolysis, or subsequent heat treatment. Formulations can be specifically designed to react with selected metals to in situ form metal carbides, oxides and other metal compounds, generally known as cermets (e.g., ceramic metallic compounds). The formulations can be reacted with selected metals to form in situ compounds such as mullite, alumino silicate, and others. The amount of metal relative to the amount of silica in the formulation or end product can be from about 0.1 mole % to 99.9 mole %, about 1 mole % or greater, about 10 mole % or greater, and about 20 mole percent or greater. The forgoing use of metals with the present precursor formulas can be used to control and provide predetermined stoichiometries.

Headings and Embodiments

It should be understood that the use of headings in this specification is for the purpose of clarity, and is not limiting in any way. Thus, the processes and disclosures described under a heading should be read in context with the entirely of this specification, including the various examples. The use of headings in this specification should not limit the scope of protection afford the present inventions.

The various embodiments of formulations, compositions, articles, plastics, ceramics, materials, parts, uses, applications, equipment, methods, activities, and operations set forth in this specification may be used for various other fields and for various other activities, uses and embodiments. Additionally, these embodiments, for example, may be used with: existing systems, articles, compositions, plastics, ceramics, operations or activities; may be used with systems, articles, compositions, plastics, ceramics, operations or activities that may be developed in the future; and with such systems, articles, compositions, plastics, ceramics, operations or activities that may be modified, in-part, based on the teachings of this specification. Further, the various embodiments and examples set forth in this specification may be used with each other, in whole or in part, and in different and various combinations. Thus, for example, the configurations provided in the various embodiments and examples of this specification may be used with each other; and the scope of protection afforded the present inventions should not be limited to a particular embodiment, example, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A nanocomposite material comprising: a first composition comprising silicon, free carbon and a first moiety, wherein the first moiety is selected from the group consisting of $Si(CH_3)_3O$, $Si(CH_3)_2O_2$, $SiC_2O_2$, $Si(CH_3)(OH)O_2$, $SiCO_3$, $SiO_4$, esters, ketones, $sp^2$ carbon structures, $sp^2$ carbon structures containing 6 to 20 carbons, —C—O—C—, —C—O—Si—, alkanes, terminal end $Si(CH_3)_2O$, —Si—C—Si—, —$Si(CH_3)_2O_2$, and $Si(CH_3)O_2$ ;

and a second composition comprising silicon and a second moiety; and wherein the first and second compositions are different compositions.

2. The nanocomposite of claim 1, wherein the first moiety and the second moiety are the same.

3. The nanocomposite of claim 1, wherein the first moiety and the second moiety are different.

4. The nanocomposite of claim 1, comprising a third composition; and wherein the third composition is different from the first and second compositions.

5. The nanocomposite of claim 2, comprising a third composition; and wherein the third composition is different from the first and second compositions.

6. The nanocomposite of claim 3, comprising a third composition; and wherein the third composition is different from the first and second compositions.

7. The nanocomposite of claim 1, wherein the first composition is a bulk phase.

8. The nanocomposite of claim 2, wherein the first composition is a bulk phase.

9. The nanocomposite of claim 3, wherein the first composition is a bulk phase.

10. The nanocomposite of claim 1, wherein the second composition is a bulk phase.

11. The nanocomposite of claim 2, wherein the second composition is a polymer derived ceramic composition and is a bulk phase.

12. The nanocomposite of claim 3, wherein the second composition is a polymer derived ceramic composition and is a bulk phase.

13. The nanocomposite of claim 1, wherein the second composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$.

14. The nanocomposite of claim 3, wherein the second composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$.

15. The nanocomposite of claim 9, wherein the second composition is selected from the group consisting of $Si(CH_3)_3O$, $SiC_3O$, $SiC_4$, $Si(CH_3)_2O_2$, $SiC_2O_2$, $Si(CH_3)(OH)O_2$, $SiCO_3$, and $SiO_4$.

16. The nanocomposite of claim 1, wherein the second composition comprises a moiety selected from the group consisting of esters, ketones, $sp^2$ carbon structures, —C—O—C—, —C—O—Si—, alkanes, terminal end $Si(CH_3)_2O$, —Si—C—Si—, —$Si(CH_3)_2O_2$, and $Si(CH_3)O_2$.

17. The nanocomposite of claim 2, wherein the second composition comprises a moiety selected from the group consisting of esters, ketones, aromatic $sp^2$ carbon structures having 6 or more carbons, —C—O—C—, —C—O—Si—, alkanes, terminal end $Si(CH_3)_2O$, —Si—C—Si—, —$Si(CH_3)_2O_2$, and $Si(CH_3)O_2$.

18. The nanocomposite of claim 4, wherein the second composition comprises a moiety selected from the group consisting of esters, ketones, $sp^2$ carbon, —C—O—C—, —C—O—Si—, alkanes, terminal end $Si(CH_3)_2O$, —Si—C—Si—, $Si(CH_3)O_3$, —$Si(CH_3)_2O_2$, and $Si(CH_3)O_2$.

19. The nanocomposite of claim 10, wherein the second composition comprises a moiety selected from the group consisting of esters, ketones, $sp^2$ carbon structures, —C—O—C—, —C—O—Si—, alkanes, terminal end $Si(CH_3)_2O$, —Si—C—Si—, $Si(CH_3)O_3$, —$Si(CH_3)_2O_2$, and $Si(CH_3)O_2$.

20. The nanocomposite of 1, having a specific gravity of from about 1.8 to about 2.2 and being substantial free of nano-voids larger than 0.01 μm.

21. The nanocomposite of 2, having a specific gravity of from about 1.8 to about 2.2 and being substantial free of nano-voids larger than 0.01 μm.

22. The nanocomposite of 3, having a specific gravity of from about 1.8 to about 2.2 and being substantial free of nano-voids larger than 0.01 μm.

23. The nanocomposite of 7, having a specific gravity of from about 1.8 to about 2.2 and being substantial free of nano-voids larger than 0.1 μm.

24. The nanocomposite of 10, having a specific gravity of from about 1.8 to about 2.5 and being substantial free of nano-voids larger than 0.001 μm.

25. The nanocomposite of 14, having a specific gravity of from about 1.8 to about 2.2 and being substantial free of nano-voids larger than 0.01 μm.

26. The nanocomposite of 9, having a specific gravity of from about 1.8 to about 2.5 and being substantial free of nano-voids larger than 0.01 μm.

27. The nanocomposite of 17, having a specific gravity of from about 1.8 to about 2.2 and being substantial free of nano-voids larger than 0.001 μm.

28. The nanocomposite of 13, having a specific gravity of from about 1.8 to about 2.5 and being substantial free of nano-voids larger than 0.01 μm.

* * * * *